United States Patent
Steinberg

(10) Patent No.: US 12,518,594 B2
(45) Date of Patent: Jan. 6, 2026

(54) AUTOMATED SPORTS WAGER SYSTEM AND METHOD UTILIZING SHARED NETWORK AND UNIFIED PROCESSING FROM MULTIPLE SPORTSBOOKS

(71) Applicants: Ingrid Vargas Carrasco, Miami, FL (US); Lawrence Moorman, Weston, FL (US); Norman Steinberg, Miami, FL (US)

(72) Inventor: Norman Steinberg, Miami, FL (US)

( * ) Notice: Subject to any disclaimer, the term of this patent is extended or adjusted under 35 U.S.C. 154(b) by 4 days.

(21) Appl. No.: 18/446,245

(22) Filed: Aug. 8, 2023

(65) Prior Publication Data

US 2024/0046742 A1 Feb. 8, 2024

Related U.S. Application Data

(60) Provisional application No. 63/396,204, filed on Aug. 8, 2022.

(51) Int. Cl.
*G07F 17/32* (2006.01)
*G06Q 50/34* (2012.01)

(52) U.S. Cl.
CPC .......... *G07F 17/323* (2013.01); *G06Q 50/34* (2013.01); *G07F 17/3288* (2013.01)

(58) Field of Classification Search
CPC .... G07F 17/323; G07F 17/3288; G06Q 50/34
See application file for complete search history.

(56) References Cited

U.S. PATENT DOCUMENTS

| | | | |
|---|---|---|---|
| 5,573,244 A * | 11/1996 | Mindes | G06Q 50/34 463/40 |
| 8,057,300 B2 | 11/2011 | Corbo | |
| 10,046,236 B2 | 8/2018 | Posin | |
| 11,763,636 B2 | 9/2023 | Huke et al. | |
| 11,804,100 B2 | 10/2023 | Huke et al. | |
| 11,861,986 B2 | 1/2024 | Huke et al. | |
| 11,869,315 B2 | 1/2024 | Dobski | |
| 2020/0357236 A1* | 11/2020 | Danielson | G07F 17/3288 |
| 2021/0012619 A1* | 1/2021 | Nelson | G06Q 20/3276 |
| 2022/0051527 A1* | 2/2022 | Trapp | G07F 17/3288 |
| 2023/0009825 A1* | 1/2023 | Rosette | G07F 17/3288 |
| 2023/0154288 A1 | 5/2023 | Mangan et al. | |

FOREIGN PATENT DOCUMENTS

WO WO-0141035 A1 * 6/2001 ............. G06Q 20/28

* cited by examiner

Primary Examiner — Kang Hu
(74) Attorney, Agent, or Firm — Peter R. Kramer; Ingenium Patents LLC

(57) ABSTRACT

An automated wagering and payout system/method, where a user signs onto a SWM shared network or Internet website, requests multiple sportsbooks for the most favorable odds for a particular side of a sports or non-sports event. The system compares odds of periods of events from multiple sportsbooks' databases within a jurisdiction, and places and registers both straight and exotic wagers utilizing odds from multiple sportsbooks' platforms offering the most advantageous odds. The system/method allows placement and processing of a single wagering ticket that combines straight and exotic wagers from odds from a network of sportsbooks' platform(s) utilizing a single keystroke. The system/method provides electronic access utilizing a user device, efficient access to user's pending wagers, wagering history, and balances of network sportsbooks' databases configured with the SWM shared network. Other features of the invention are described.

18 Claims, 27 Drawing Sheets

| 304/306/308 | LSB 310A | LSB 310B | LSB 310C | LSB 310D |
|---|---|---|---|---|
| 1H-SPRD PHL/NYG | F/S/V 315 | F/S/V 316 | F/S/V 317 | F/S/V 318 |
| FG-SPRD PHL/NYG | F/S/V 319 | F/S/V 320 | F/S/V 321 | F/S/V 322 |
| 1H-T PHL/NYG | TOT. PTS/P 323 | TOT. PTS/P 324 | TOT. PTS/P 325 | TOT. PTS/P 326 |
| FG-ML PHL/NYG | F/ML U/ML 327 | F/ML U/ML 328 | F/ML U/ML 329 | F/ML U/ML 330 |

| 304/306/308 | LSB 310A | LSB 310B | LSB 310C | LSB 310D |
|---|---|---|---|---|
| 1H-SPRD PHL/NYG | PHL-3 (401) | PHL-3-100 (402) | PHL-2.5-130 (403) | PHL-3-115 (404) |
| FG-SPRD PHL/NYG | PHL-6-110 (405) | PHL-6-115 (406) | PHL-5.5-145 (407) | PHL-6-120 (408) |
| 1H-TOT. PHL/NYG | 23 (409) | 23.5 (410) | 24 U-120 (411) | 23.5 O-115 (412) |
| FG-ML PHL/NYG | PHL-270 (413A) | PHL-275 (414A) | PHL-278 (415A) | PHL-270 (416A) |
| | NYG+220 (413B) | NYG +225 (414B) | NYG +232 (415B) | NYG +220 (416B) |

FIG. 4

| 304/306/308 | LSB 310A | LSB 310B | LSB 310C | LSB 310D |
|---|---|---|---|---|
| 1H-SPRD PHL-NYG | PHL-3 (401) | PHL-3-100 (402) | PHL-2.5-130 (403) | PHL-3-115 (404) |
| FG-SPRD PHL/NYG | PHL-6-110 (405) | PHL-6-115 (406) | PHL-5.5-145 (407) | PHL-6-120 (408) |
| 1H-T PHL/NYG | OVER 23 (409) | OVER 23.5 (410) | 24 U-120 (411) | 23.5 O-115 (412) |
| FG-ML PHL/NYG | PHL-270 (413A) | PHL-275 (414A) | PHL-278 (415A) | PHL-270 (416A) |
| | NYG+220 (413B) | NYG +225 (414B) | NYG +232 (415B) | NYG +220 (416B) |

490 — STRAIGHT 402 RISK/WIN
491 — STRAIGHT 405 RISK/WIN
492 — STRAIGHT 409 RISK/WIN
493 — STRAIGHT 413A RISK/WIN

S-P-T (429)   SUBMIT (430)

| 304/306/308 | 312 | LSB 310X (604) | LSB 310Y (605) |
|---|---|---|---|
| FG-ML PHL/NYG (600) | PHL (601) | PHL-270 (602) | PHL-270 (603) |
|  |  |  |  |

| S-P-T (429) | STRAIGHT RISK/WIN (475) | SUBMIT (430) |
|---|---|---|

FIG. 6

| MEMBER # | XXXXX | | LSB 310A | | (604) |
|---|---|---|---|---|---|
| PASSWORD | XXXXX | (802) | | ACCOUNT BAL (803) | |
| PHL-270 (413A) | $270 RISK (811) | $100 TO WIN (812) | | STRAIGHT BET TYPE (813) | |
| TRANSFER FROM ACCT (814) | TRANSFER TO ACCT (815) | FUND ACCT (805) | | $ AMOUNT (806) | |
| | | | | | |

| CONFIRM BET (807) | ACCOUNT BAL (808) |
|---|---|

| OPEN BETS (809) | HISTORY (810) |
|---|---|

FIG. 8

| USE THIS NAME (901) |||
|---|---|---|
| USE THIS ADDRESS |||
| USE THIS CC CARD FUND |||
| USE THIS BILLING ADDRESS |||

| MEMBER # XXXXX (902) || LSB310A (604) |
|---|---|---|
| PASSWORD XXXXX (903) | ENTER | ACCOUNT BAL |
| REPEAT PASSWORD (904) | (905) | (906) |
| PHL-270 (413A) | $270 (911) RISK | $100 TO WIN (912) | STRAIGHT BET TYPE (913) |

| SUBMIT (430) | ACCOUNT BAL (909) |
|---|---|

| OPEN BETS (910) |
|---|

FIG. 9

| 306/308 | LSB 310A | LSB 310B | LSB 310C | LSB 310D |
|---|---|---|---|---|
| 1H-SPRD DAL/WAS | DAL-3-110 (417) | DAL-3-100 (418) | DAL-2.5-130 (419) | DAL-3-115 (420) |
| FG-SPRD DEN/KC | DEN-6-110 (421) | DEN-6-115 (422) | DEN-5.5-145 (423) | DEN-6-120 (424) |
| 1H-TOT. MIA/SD | 23 (425) | 23.5 (426) | 24 U (427) | 23.5 O-115 (428) |
| FG-ML PHL/NYG | PHL-270 (413A) | PHL-275 (414A) | PHL-278 (415A) | PHL-270 (416A) |
| | NYG+220 (413B) | NYG +225 (414B) | NYG +232 (415B) | NYG +220 (416B) |

S-P-T (429)

SUBMIT (430)

FIG. 10

| 304/306/308 | | | |
|---|---|---|---|
| 1H-SPRD DAL/WAS | DAL-2.5-130 (419) | LSB 310C | PARLAY OR TEASER TYPE (1101) |
| FG-SPRD DEN/KC | DEN-6-110 (421) | LSB 310A | PARLAY OR TEASER TYPE (1102) |
| 1H-TOT. MIA/SD | U 24 -120 (427) | LSB 310C | PARLAY OR TEASER TYPE (1103) |
| FG-ML PHL/NYG | NYG +232 (415B) | LSB 310C | PARLAY OR TEASER TYPE (1104) |

4-TEAM PARLAY RISK/WIN (700)

SUBMIT (430)

FIG. 11

| 1H-SPRD (304/306/308) DAL/WAS | DAL-2.5-130 (419) | LINE (705) CHANGE | A---D---S---OS (709) |
|---|---|---|---|
| FG-SPRD DEN/KC (304/306/308) | DEN-6-110 (421) | LINE (706) CHANGE | A---D---S---OS (710) |
| 1H-T MIA/SD (304/306/308) | U 24 -120 (427) | LINE (707) CHANGE | A---D---S---OS (711) |
| FG-ML PHL/NYG (304/306/308) | NYG +232 (415B) | LINE (708) CHANGE | A---D---S---OS (712) |

4-TEAM PARLAY RISK/WIN (700B)

| 1H SPRD PHL-3-110 (402) | LINE (713) CHANGE | A---D---S---OS (714) | STRAIGHT RISK/WIN (700D) |
|---|---|---|---|
| FG-SPRD PHL-6-110 (405) | LINE (715) CHANGE | A---D---S---OS (716) | STRAIGHT RISK/WIN (700E) |
| 1H-TOT. PHL/NYG OVER 23 (409) | LINE (717) CHANGE | A---D---S---OS (718) | STRAIGHT RISK/WIN (700F) |
| FG-ML PHL/NYG PHL-270 (413A) | LINE (720) CHANGE | A---D---S---OS (721) | STRAIGHT RISK/WIN (700G) |

TOTAL RISK/WIN (700C)

SUBMIT (430)

FIG. 12

USER PARLAY BET TICKET SWM

1701

419 Dal 1H-SPRD -2.5 -130/ 421 Den -6 -110 FG-SPRD/427 Mia 1H Tot U24-120/415B NYG FG-ML +232

COMPACT RR (4P-3T) RISK/WIN Ticket #

FIG. 17

LSB 310A (TRANSMITTED TO LSB PENDING BETS DATABASE)

1801

421 Den -6 -110 FG-SPRD/427 Mia 1H Tot U24-120/ 419 Dal 1H-SPRD -2.5 -130 RISK/WIN/ 421 Den -6 -110 FG-SPRD COMPACT RR 4P-3T PARLAY RISK/WIN

421 Den -6 -110 FG-SPRD/ 419 Dal 1H-SPRD -2.5 -130/415B NYG FG-ML +232 COMPACT RR 4P-3T PARLAY RISK/WIN

421 Den -6 -110 FG-SPRD/ 427 Mia 1H Tot U24-120 /415B NYG FG-ML +232 COMPACT RR 4P-3T PARLAY RISK/WIN

FIG. 19

LSB 310C (TRANSMITTED TO LSB PENDING BETS DATABASE)
1803

419 Dal 1H-SPRD -2.5 -130/427 Mia 1H Tot U24-120/415B NYG FG-ML +232 COMPACT RR 4P-3T PARLAY RISK/WIN

419 Dal 1H-SPRD -2.5/427 Mia 1H Tot U24-120/ 421 Den -6 -110 FG-SPRD COMPACT RR 4P-3T PARLAY RISK/WIN

419 Dal 1H-SPRD -2.5 -130/ U24-120/415B NYG FG-ML +232/ 421 Den -6 -110 FG-SPRD COMPACT RR 4P-3T PARLAY RISK/WIN

427 Mia 1H Tot U24-120/415B NYG FG-ML +232/ 421 Den -6 -110 FG-SPRD COMPACT RR 4P-3T PARLAY RISK/WIN

FIG. 20

| 304/306/308 | LSB 310A | LSB 310B | LSB 310C | LSB 310D |
|---|---|---|---|---|
| FG-ML PHL/NYG | PHL-270 (413A) | PHL-275 (414A) | PHL-278 (415A) | PHL-270 (416A) |
| | NYG+220 (413B) | NYG +225 (414B) | NYG +232 (415B) | NYG +220 (416B) |

FIG. 25

AUTOMATED SPORTS WAGER SYSTEM AND METHOD UTILIZING SHARED NETWORK AND UNIFIED PROCESSING FROM MULTIPLE SPORTSBOOKS

CROSS-REFERENCE TO RELATED APPLICATION

The present application claims the benefit of and priority to U.S. Provisional Patent Application No. 63/396,204, entitled "SPORTS WAGER MALL" and filed on Aug. 8, 2022, which is hereby incorporated by reference in its entirety.

FIELD OF THE INVENTION

The present disclosure relates to automatic systems and methods for placing and processing, comparing, betting of odds, spreads, propositions, totals of periods of sporting and non-sporting events with licensed sportsbooks and a computerized user interface for geo-locating, placing, management and processing of wagers.

BACKGROUND OF THE INVENTION

With broader access to sports wagering becoming possible after the U.S. Supreme Court struck down the Professional and Amateur Sports Protection Act in 2018, wagering on sports in certain jurisdictions (e.g., different states within the U.S.) has become a popular leisure activity. The Internet also has increased the possibilities for gambling online. With an increase in the number of legally licensed providers of Internet gambling, it has become increasingly important to be able to provide a system that can compare spreads/odds as well as to consider the many betting options of the same wagering event.

In many gambling and wagering establishments and systems today, bets can be placed on most major sports including professional and college football, soccer, baseball, basketball, ice hockey, tennis, boxing, golf, and rugby. Additionally, bets are placed on various sports tournaments including the NCAA Men's and Women's Basketball Championships and World Cup Soccer. Bets can be also placed (with payouts) on auto racing, horse racing, political races, entertainment awards and many other non-sporting activities.

Sports betting became legal by way of federal law to all states on May 14, 2018, when the U.S. Supreme Court overturned the Professional and Amateur Sports Protection Act (PASPA or Bradley Act, 1992), lifting the ban on states being able to establish their own sports wagering industries. Previously to that time three states had a monopoly on legal sports betting in the country.

To date, nearly two-thirds of the states have approved some form of legal sports wagering, whether via mobile apps, Internet, or in-person sportsbooks. However, the boundaries are somewhat limited, as the Interstate Wire Act of 1961 still prohibits bettors from placing a bet across state or international lines into another jurisdiction using a wire communication or the Internet.

While a bettor need not be a resident of one of the states to place a bet, he or she must be physically located in the state at the time the bet is made with Licensed Sportsbook facilities or operators (hereinafter, referred to as "LSBs"). The Federal Interstate Wire Act also forbids LSBs from transmitting gambling information (e.g., spreads and odds) interstate or internationally for public view into jurisdictions where they have no Internet gambling license, or where Internet gambling is illegal. Presently, Independent LSBs violate this federal law regularly, when on nationally televised sports events they advertise the in-game line.

Most professional and collegiate leagues prohibit players and coaches from betting on sporting events in fear that it will tarnish the integrity of the sport. For example, the NFL has suspended players recently for placing bets online on NFL games or for placing bets on other leagues while in the team's facility or while traveling with the team. Thus, there are very important restrictions on who is allowed to place bets on certain games or events.

Typically, bets can be made on different periods of sporting events. These include and are not limited to the first quarter (1Q), first half (1H), second half (2H), or the full game (FG). The line on the event period can be the difference in points that a team must win the designated period by, commonly referred to as the spread (SPRD), whereupon if a team is favored by six (6) points, the team must win the event by more than six (6) points to be declared a bet winner. The team can also be bet to win a designated period using a money line (ML), whereupon the team needs only to win the designated period outright to be declared the winner in the contest.

It is also necessary to risk more on a team favored (e.g., the favorite) for a smaller return, while a team not favored (e.g., the underdog) requires the bettor to risk less to win a larger return on his bet. For example, the money line on a team favored by 6 points could be -270, wherein the bettor must risk $270 for each $100 returned on his bet, while betting the ML on the underdog on a period of the same spread (e.g., getting 6 points) could be +220, wherein the bettor gets a return of $220 in winnings for every $100 risked if the team wins outright by any margin. The $50 difference between what is risked on the favorite and what is paid out on the underdog is the Vigorous or "vig," which the sportsbooks (LSB) are guaranteed as a profit if equal amounts are bet on both sides of the ML.

Normally, an LSB charges a vig of 10% or -110 to a bettor for a bet on the spread line, where the bettor risks $110 to win $100. In some instances, a spread line might include a vig greater or lesser than -110. Hence, a line for a period might appear -3 -115, whereas the Bettor's team must not only win the contest by more than 3 points in the period, but the Bettor must also risk $115 to win $100 on the event period. Conversely, if a spread appeared -3 +105 this indicates the bettor is risking $100 to win $105 if his team covers the spread of the event period. Most sportsbooks will allow the Bettor to buy points, to move the point spread off of the opening or closing spread, usually in increments of a half point, increasing the price of the bet, sometimes by increasing the vig, or the hold that the sportsbook takes.

The bettor can also bet on the total amount of points, goals, runs (Tot. Pts.) two teams or two athletes will combine to score in any specified period. The bettor can place a bet on whether the total combined points for both teams or players in the period will go over (O) or under (U) a designated total. Again, the bettor could be laying a vig associated with the bet on the total.

Most LSBs offer in-game (IG) wagers to the bettors, which allows betting while the contest is in progress. Thus, while the contest is in progress, the LSB can post an adjusted full game (FG) line, which would comprise a new full game spread, new full game ML, and total. In-game wagers can also include a bet on whether the players or teams will be successful in achieving a certain future play in the event.

LSBs also offer exotic wagers known as parlays and teasers. To win a parlay bet the bettor must win all multiple designated wagers placed as a single bet. Teasers are multiple wagers placed as one bet, whereas the LSB offers an adjusted full-game spread on each team used in the bet, but again, all teams must win or tie the line. Exotic wagers usually offer payoff odds depending on how many teams are bet within the exotic wager. For example, a bettor might be paid 6-1 odds on a successful 3-team parlay or 7-team teaser, which is a $600 return for every $100 risked by the bettor.

OBJECTS AND SUMMARY OF THE INVENTION

Presently, there are no systems or methods that can combine and process wagers from multiple LSBs utilizing a single ticket.

In addition, presently, there are no known systems or methods that allow a bettor to bet one or more LSBs without opening or maintaining a betting account with each LSB.

Similarly, there are no known methods or system, even in stand-alone conventional sportsbooks, where exotic and straight wagers can be placed simultaneously on a single wagering ticket.

Presently, known methods/systems are unable to process exotic bets consisting of multiple wagers of odds, spreads, and totals of multiple sportsbooks combined on a single wagering ticket.

Moreover, presently, there are no known methods and systems where bettors can simultaneously place wagers with multiple LSBs directly and can receive a single betting ticket from a shared network comprising all the wagers placed directly and independently by the bettor with multiple LSBs.

Also, there is a need for a centralized interface or system that allows bettors to centrally view and process all their wagers, betting history, and balances from multiple LSBs they belong to utilizing a single interface or website.

There is also a strong need for an automated and centralized interface or system that allows bettors to fund LSB member accounts, or transfer funds between multiple member LSB accounts while placing bets in real time. Similarly, there is also a need for a system that allows bettors to become members of an LSB during the betting process.

Moreover, there is a strong need for an automated system and method that allows bettors to view and compare odds' changes from multiple sportsbooks in real time, while placing wagers with multiple LSBs and have the option to replace the bet in which the odds have changed with more favorable odds offered by another LSB.

Presently there is no sportsbook available where bettors can view and compare odds' changes from sportsbooks in real time while placing wagers and have the option to change the bet to the other side e.g., player or team, while finalizing the betting ticket.

Presently, there is no betting website available where the bettor can request from multiple LSBs the best odds, spreads, totals for a specific "side" of a sporting event period or prop.

Presently, there is no method available where the bettor can compare odds of multiple sportsbooks and bet those odds without incurring a fee other than the vig.

In accordance with the present invention, the systems/methods described herein provide a computerized and automated system that addresses and resolves many of the limitations, shortcomings, and problems of presently existing systems and methods, such as those described above.

In accordance with the present invention, it is an objective to provide a centralized and automated system that utilizes the Internet and networks and utilizes computer software, stored in the computer memory and executed by a processor in a specific way that allows the user to: (a) interact with multiple LSBs within multiple jurisdictions; (b) place and process betting lines from multiple licensed sportsbooks in multiple jurisdictions; (c) request odds and register bets with LSBs that offer the most advantageous and favorable odds, spreads, totals, propositions, and betting options for both sporting events and non-sporting events; (d) combine different LSBs' bets in the same ticket; and (e) combine different types of exotic and other bets in a same ticket.

It is another objective of the present invention to optimize betting options and line value for the bettors through the ability to shop for the most beneficial odds, promotions, and reward programs offered by multiple LSBs on a shared network.

It is a further objective of the present system to limit the dissemination of gambling odds into prohibited jurisdictions, and also facilitate bets made directly between the bettor and the LSBs in jurisdictions where Internet gambling is legal.

Additional objectives are disclosed and apparent from the discussion herein.

In at least one embodiment, the present invention provides a computerized and automated system that uses a shared network, e.g., Sports Wager Mall, for licensed sportsbooks (LSBs) to display odds, spreads, and totals of sporting events along with the sporting events' related propositions, in a pre-game or in real-time wagering format. A computer processor, like a CPU (or multiple CPUs), executes specific computer instructions stored in computer memory (e.g., RAM, ROM or external memory devices) that cause the processor and the system to: (a) display available wagering events; (b) display one or more available odds from at least one LSB providing odds to the wagering network; and (c) accept wagers by multiple LSBs directly from a user input device, some in different geographic locations, through configuration with a computer interface, and provide the odds, spreads, and totals for betting by the users who are not limited by the conceptual, technical or legal limitations of presently known systems and LSB's betting operations.

Another aspect/feature of the present invention is the ability to automatically identify attempts to violate the law and prevent persons from accessing betting information illegally disseminated by LSBs across the state lines (or into states where Internet gambling or any gambling is prohibited or limited) or into foreign countries in direct violation of the Federal Interstate Wire Act.

In at least one embodiment, the present invention may utilize Geographical Location Authentication by the shared network, geo locate the user who may be using mobile device, and limit content access, e.g., viewing of odds of LSBs to users who are not physically located within the same or permitted jurisdictions where the LSBs are doing business or where LSBs are permitted to provide betting information and/or automatically process bets from the users.

The methods/systems of the present invention, in various embodiments, achieves a further important objective by automatically identifying (through Geographical Behavioral Comparison) the players, coaches of the playing teams or others placing bets online, where such bets may be in contravention or violation of the sports league's bylaws, local or state laws or ordinances, or other legal or ethical restrictions or rules.

In certain embodiments, systems and computer-implemented methods by software are provided for a Sports Wager Mall (hereinafter, "SWM") system operating on a server or other network service hardware platform configured in communication with multiple LSBs and Sports Wager Mall, having its computerized system that includes one or more processors, software stored in computer memory and system database that stores important data. In one example of a Sports Wager Mall system, a data network connection enables the system to electronically communicate over a data network with a plurality of user devices so that users can: (a) request, receive and compare odds on specific periods of future or live sporting events and related props with the LSBs participating in the shared network; (b) request, receive and access the best odds for a specific side to a sporting event or prop; (c) place bets directly with more than one LSB utilizing a single betting ticket or a voucher; (d) place bets directly with more than one LSB by utilizing a single account, voucher or ticket; (e) become members of LSBs while placing wagers; (f) combine straight and exotic bets from one or more LSBs, processed by the shared network into a single wagering ticket; (g) make requests for more favorable odds, if odds, spreads, or totals change, before finalizing the wager ticket, (h) view betting history and pending wagers of bets placed at multiple LSBs, in different geographic areas, through the shared network account; (i) use a common interface to view betting history and balances of LSB accounts that the user is a member of; (j) electronically fund one or more LSBs that the user is a member of; and (k) and in one embodiment eliminate the need for user to even become a member of LSBs, while allowing the user to place wagers directly with multiple LSBs participating in the shared network.

In accordance with a further aspect/feature of the invention, after receiving a user request for the above-mentioned odds, spreads, and totals from multiple LSBs, the system may include LSBs' display of one or more sporting event lines utilizing an interactive video machine, kiosk, or television display. A further aspect may include display of the multiple LSBs' event lines using at least one embodiment of the Internet or network-connected system of the present invention or using an interactive website for delivery of information to each user or multiple users.

In accordance further method embodiments of the present invention, a method of providing odds and processing sports and non-sports wagers placed by a user comprises the following: receiving and processing a request from a mobile user device, requesting to provide or compare odds on specific periods of a future, pregame or live sporting event or proposition from one or more licensed sportsbook operators (LSBs) participating in a shared network, electronically obtaining from the LSBs best odd information for a specific side to the requested live sporting event or proposition, transmitting for display on the user mobile device the obtained best odd information for a specific side to the requested sporting event or proposition, receiving and processing a plurality of wagers from the user mobile device for the LSBs participating in the shared network, wherein said plurality of wagers combine multiple bets into a single betting ticket or electronic voucher, storing the received betting tickets, containing the plurality of wagers, into non-transient computer memory or external storage, organized as a betting history of the user, and providing an interface for viewing betting history and pending wagers placed by the user with multiple LSBs through the shared network account.

As an aspect of the invention, the single betting ticket or electronic voucher combines bets for different LSBs located in different geographic areas. The method further comprises calculating risks and payout for the single betting ticket or electronic voucher that combines multiple bets, and transmitting for display the payout information for each of said LSBs.

As another aspect of the invention, the method further comprises placing directly with one or more LSBs participating in the shared network each of the multiple combined bets on the same ticket or voucher.

As a further aspect of the invention, the method includes at least one straight bet and at least one exotic bet from one or more LSBs as the multiple combined bets on the same ticket or voucher.

As a feature of this aspect, the method further computes and displays risk and win of one or more of the LSBs contributing wagers to the at least one exotic bet placed with one or more LSBs.

As another aspect of the invention, the method maintains the database of histories of bets made by a plurality of users with the LSBs, extracts the user's graded pending bets from the database of pending bets made by a plurality of users with the LSBs, and updates the user's betting history with the graded pending bets.

As a further aspect of the invention, the method receives and processes additional requests for more favorable odds before finalizing the wager ticket or voucher, updates odds in an event that odds, spreads, or totals change, and finalizes the wager ticket or voucher with updated odds.

As a feature of this aspect, the method replaces a wager for a team or player with odds of an opposing team or player before confirming bets.

As a further aspect of the invention, the method provides a user interface for viewing and displaying the betting history, the pending wagers of bets placed at the multiple LSBs by the user and displaying balances of LSB accounts in which the user maintains a membership.

As another aspect of the invention, the method allows wager processing through the shared network when the user is not a member with multiple LSBs participating in the shared network.

As an additional aspect of the invention, the method provides electronic funding to one or more LSBs in which the user is not a member. Funding includes holding, debiting, crediting, and/or transferring funds to and/or from a monetary user account to each of the LSBs participating in the shared network.

As yet another aspect of the invention, the funding of the LSBs is facilitated and proceeds though at least one server of the shared network, transmitting funds between and among the monetary user account and one or more funding accounts of the LSBs.

As yet an additional aspect of the invention, the method processes a request from the user to display a most favorable odds and spreads for the designated side of the future, pregame, or live sporting event or proposition.

Still as yet another aspect of the invention, the method determines whether there are any restrictions on providing odds to the user or permitting placement of a bet for the user with any of the LSBs, detects logins to multiple jurisdictions by users of the shared wagering network to deter the user from violating state, LSB, industry or league laws, rules or regulations, and prevents the user from viewing the odds and spreads of the LSBs outside a state jurisdiction where the user is physically located.

In accordance further system embodiments of the invention, a system for providing and processing sports and non-sports wagers placed by a user comprises: a computer server serving a shared network of one or more licensed sportsbook operators. The server has at least one computer processor that executes a computer program stored in computer memory that causes the computer server to: receive and process a request from a mobile user device, requesting to provide or compare odds on specific periods of a future, pre-game or live sporting event or proposition from one or more licensed sportsbook operators participating in a shared network, electronically obtain from the LSBs best odd information for a specific side to the requested live sporting event or proposition, transmit for display on the user mobile device the obtained best odd information for a specific side to the requested sporting event or proposition, receive and process a plurality of wagers from the user mobile device for the LSBs participating in the shared network, wherein said plurality of wagers combine multiple bets into a single betting ticket or electronic voucher, store the received betting tickets, containing the plurality of wagers, into non-transient computer memory or external storage, organized as a betting history of the user, and provide an interface for viewing betting history and pending wagers placed by the user with multiple LSBs through the shared network account.

In accordance with aspects and features of these system embodiments, any of the foregoing method summary steps and features can be implemented by the above-mentioned processor on the server (or another processor or multiple processors) executing special instructions that accomplish the aforementioned features.

The above summary of various embodiments, aspects, and features of the invention are representative, and multiple additional embodiments, aspects and features of the invention, as well as additional objectives and advantages of the invention, are further described in the sections below. Moreover, other advantages of the invention will be readily apparent to those of ordinary skill in the art from the description herein.

BRIEF DESCRIPTION OF THE DRAWINGS

The following detailed description, given by way of example and not intended to limit the present invention solely thereto, will best be appreciated in conjunction with the accompanying drawings, wherein like reference numerals denote like elements and parts, in which:

FIG. 4 is a block diagram and illustration showing exemplary components, data structures and organization of a LSB response to an odds request by a user in FIG. 3, which can be used to communicate and process a placed bet with the LSBs in certain embodiments of the invention.

FIG. 6 is an illustration of the exemplary data structure and organization of the responses from one or more LSBs to a request for the "best available odds/line" for a side to an event in certain embodiments of the invention.

FIG. 8 is an illustrative example of the data structure and organization of data and functional components of a system to fund an account that is used by a user who is a member of an LSB in certain embodiments of the invention.

FIG. 9 is an illustrative example of the data structure and organization of data and functional components that is used by a non-member of an LSB to become a member of the LSB to finalize a bet in certain embodiments of the invention.

FIG. 10 is an illustrative example of the data structure and organization of data and functional components that are used by a user to place an exotic wager with LSBs in certain embodiments of the invention.

FIG. 11 is an illustrative example of the data structure and organization of data and functional components for an exotic wager submission ticket in certain embodiments of the invention.

FIG. 12 is an illustrative example of the data structure and organization of data and functional components for a final betting ticket or voucher (for a Sports Wager Mall) comprising straight and exotic bets made with multiple LSBs in certain embodiments of the invention.

FIG. 17 illustrates an example of a data organization, format and functional structure of a pending bet that may appear in the user pending bet databased in SWM, according to certain embodiments.

FIGS. 19 and 20 illustrate examples of data organization, format, and functional structure of the four bets in the user four parlay ticket shown in FIG. 17, as it is stored, organized and processed in the two respective participating LSBs' sportsbook databases, according to certain embodiments.

FIG. 25 is a block diagram showing exemplary components, data structure and organization of an LSB response to an odds request by a user in FIG. 24, which can be used to communicate and process placed bet with the LSBs in certain embodiments of the invention.

Figure 1:
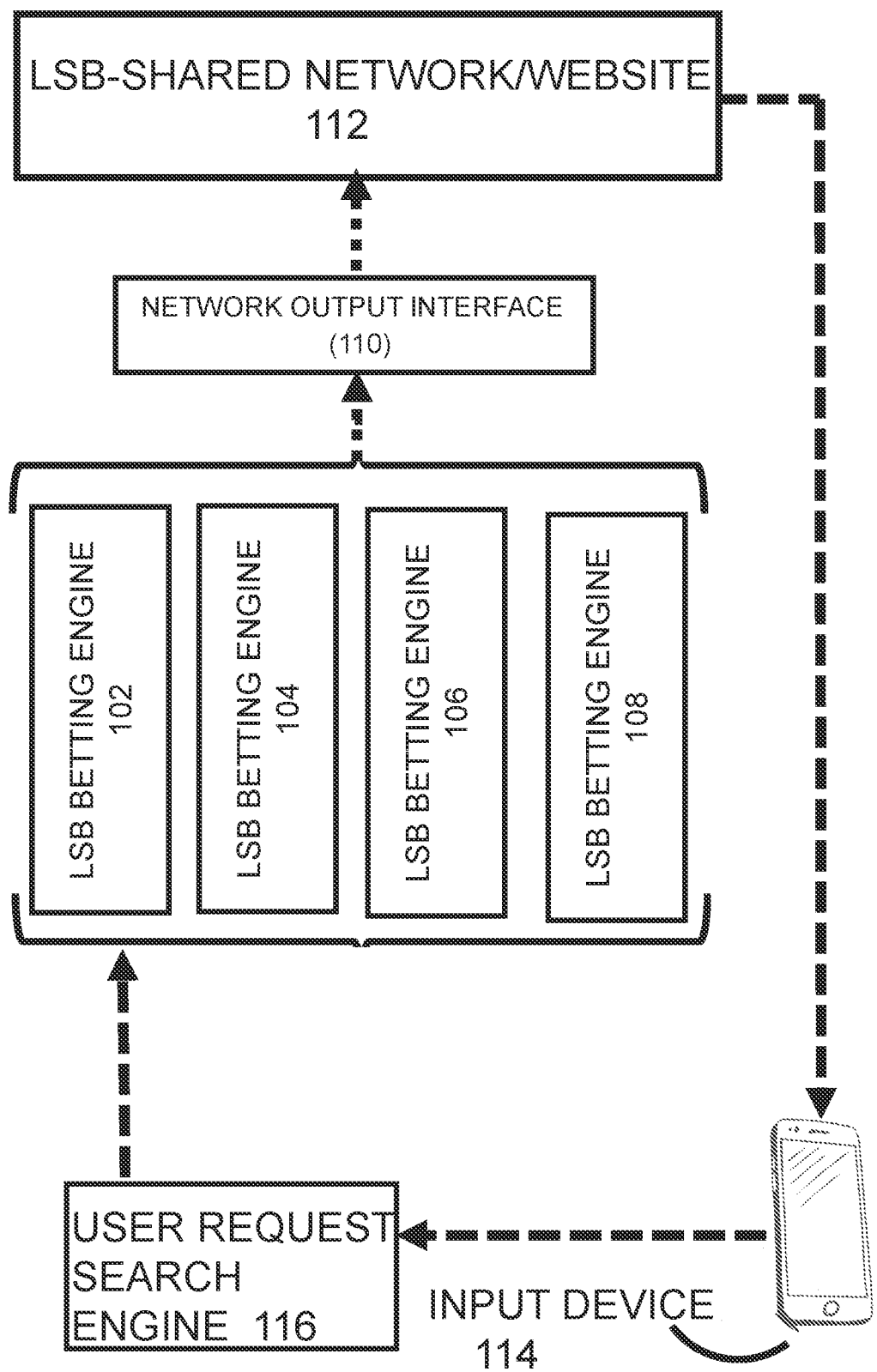
FIG. 1 is a schematic block diagram of an overall system of certain embodiments of the invention, showing multiple LSB betting engines outputting to a shared network that interacts with an input device to initiate a bet with the LSB betting engines in accordance with the present invention.

The accompanying drawings are representative and, accordingly, are not intended to limit the invention by what is shown within the figures. Rather, the information is used, in combination with the textual description herein, to explain the various embodiments, aspects and features of the present invention. Accordingly, the numbers, odds and other data shown in the figures are not intended to be limiting, unless otherwise stated in the description herein.

DETAILED DESCRIPTION OF THE PRESENT INVENTION

This disclosure as a whole may be best understood by reference to the following detailed description when read in conjunction with the accompanying drawings, drawing descriptions, abstract, background, field of the disclosure, and associated headings Identical reference numerals when found on different figures identify the same elements or a functionally equivalent element. The elements listed in the abstract are not referenced but nevertheless refer by association to the elements of the detailed description and associated disclosure.

Reference throughout this specification to "one embodiment," "an embodiment," "another embodiment," "certain embodiment," "certain embodiments," "one example," "another example," "one aspect," another aspect" and the like is intended to mean that a particular feature, structure, or characteristic described in connection with such embodiment or example is included in at least one embodiment of the present disclosure and may be variously included in other embodiments. Moreover, the features, structures, or characteristics that are described may be combined in any suitable combination and/or sub-combination in one or more embodiments or examples.

Several or different elements discussed below, and/or claimed, are described as being "coupled," "in communication with," "in configuration with," or "configured to be in communication with" and like terms. This terminology is intended to be non-limiting, and where appropriate, be interpreted to include without limitation direct or indirect contact and/or wired or wireless communication using any one or a plurality of suitable protocols.

The reference to an element in the singular in the specification or claims is not intended to mean "one and only one" unless specifically stated, but rather "one or more."

The embodiments of the present invention provide for a novel and improved automated system and method for conducting sports event and other betting comparing odds from multiple LSBs, including various features and functionality of the present invention that are automatically implemented and processed in real time (e.g., while a game or event are on-going).

The SWM of the present invention may be implemented as a shared network of sportsbooks that provide information, receive communications and provide automatic and related responses to the user's requests and input, and assist the user, through an automated communication system, a user request search engine 212, shared network, LSBs' betting engine 201 and a user's mobile device 207, in facilitating the requesting, comparing, and betting on odds with multiple sportsbooks simultaneously. In one embodiment, the present invention accomplishes this without the use of a betting engine. Instead, it may utilize a shared network server, supported by network interfaces, configured to display requested odds by users from the network sportsbooks and configured to facilitate bets being made by the user directly with the shared network server 1614 configured with the betting engines 1601 of the network sportsbooks.

Among many other features/benefits, users don't have to login into each individual sportsbook site to place bets. Moreover, the users of such system and method can combine straight and exotic wagers on a single ticket generated by SWM while all of the bets of the SWM ticket are being placed with the independent sportsbooks. Therefore, the improved system and method provides the flexibility and additional functionality for the user in allowing (a) to choose and combine odds from multiple sportsbooks, (b) memorialize the transactions of multiple sportsbooks on one software system through its own memory and storage at a single website, and (c) require less storage than a conventional sportsbook requires because the transactional database could be smaller if a SWM monetary transactional account is utilized in accordance with some embodiments described below.

A schematic block diagram of an overall system, with multiple LSB betting engines outputting to a shared network, which interacts with an input device to initiate a bet with LSB betting engines in accordance with certain embodiments of the invention is illustrated with reference to FIG. 1. It further illustrates the use of a network (e.g., the Internet) to facilitate sport event betting at an Internet-based network/website shared by multiple LSBs. Among many technical improvements and benefits, the sport and other types of event betting are improved. In particular, the bettor has odds available to him from multiple LSBs, and can compare, and place bets with the most favorable odds directly with the LSBs.

FIG. 1 shows multiple betting engines 102, 104, 106, and 108, comprising servers from four different LSBs, interacting with, and in configuration with a shared network website 112 shared with multiple LSBs utilizing a network input/output device 110, which is used to create an additional communication port on a computer or server, which can then be connected to a shared network 112, which can service multiple LSBs in different physical locations in different states. The shared network 112, which electronically transmits betting lines to an input device 114, such as a user's input device, which facilitates the user's input device to be in communication with, and interact with, not only the LSB-shared Network/website 112, but also be in communication with one or more LSB betting engines 102, 104, 106, and 108, through a User Search Engine 116, to place a bet directly by the user with the LSB platform. The User Search Engine 116 facilitates individual user bet requests to the corresponding LSBs, perform searches for the users, check user's authorization to place bets (i.e., check whether a particular user is authorized to place bets on a particular event or team, etc.).

The communication network, if wireless, may be implemented using communication techniques such as Visible Light Communication (VLC), Worldwide Interoperability for Microwave Access (WiMAX), Long Term Evolution (LTE), Wireless Local Area Network (WLAN), Infrared (IR) communication, Public Switched Telephone Network (PSTN), Radio waves, and other communication techniques known in the art. The aforementioned system described in FIG. 1 and components, including betting engines configuring in communication with the input and output devices, could be implemented by using software such as Erlang programming language run using an OTP (Open Telecom Platform) collection of libraries for Erlang or using "Erlang/OTP," e.g., the language and the libraries together. The Erlang runtime environment (a virtual machine, much like the Java virtual e) means that code compiled on one architecture runs anywhere. The language has been used n high-volume conventional sports betting markets with success. A significant benefit with Erlang is that is relevant to the shared network method is you can achieve such an uptime, while integrating various extensions and components of a site, without using too many resources. Everything can run on virtual machines, such as a cloud, which means there is less demand for physical servers to keep and maintain the site running and operational, or to process large volume of requests from many users.

Figure 2:
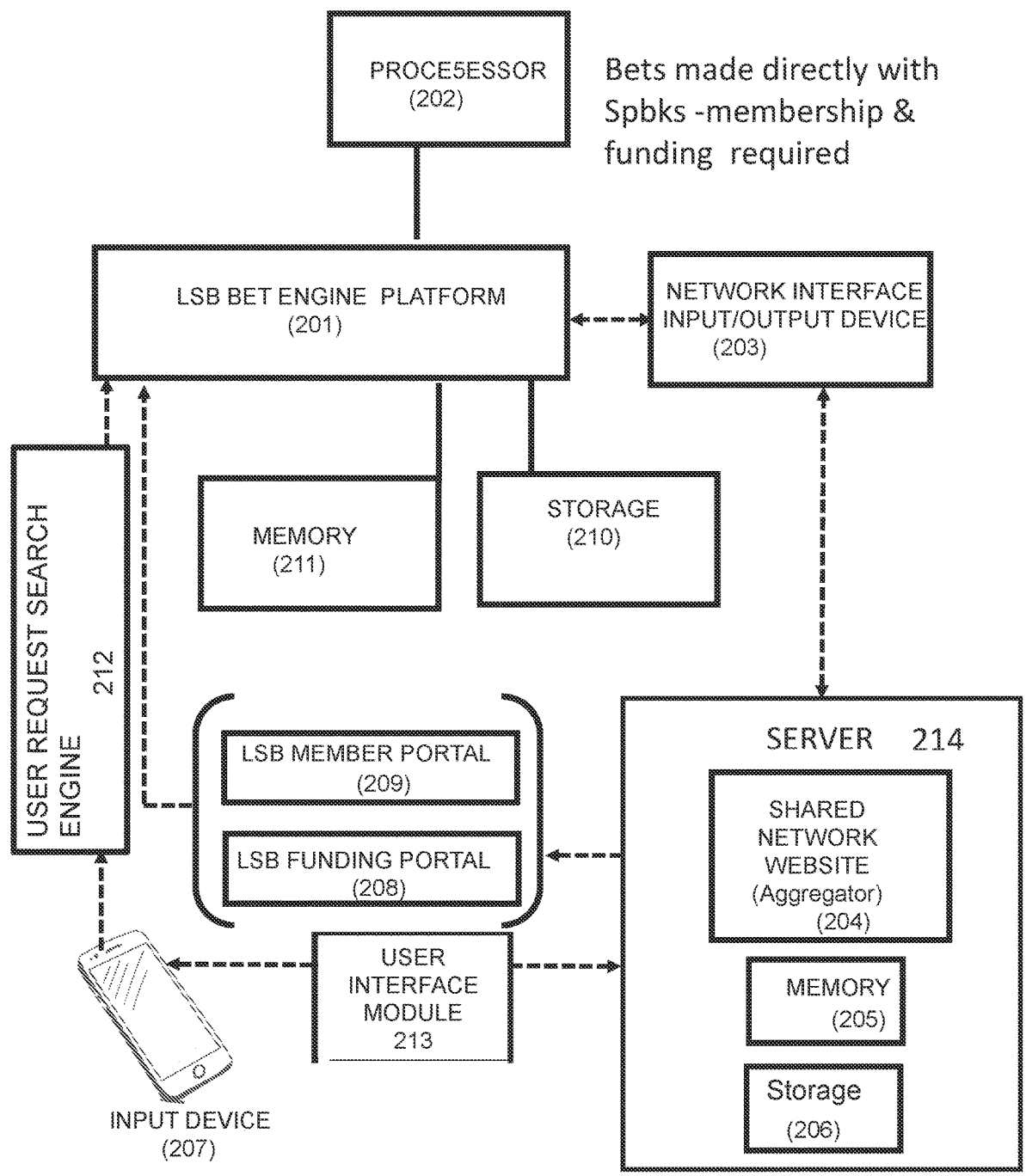
FIG. 2 is a schematic block diagram showing components of an LSB betting system in accordance with various embodiments of the invention.

An example of some embodiments of the LSB computer system is illustrated in FIG. 2. It includes a bet engine platform 201, which the LSB betting systems depend on. The bet engine platform 201 includes or is coupled with a processor 202 (or multiple processors) that execute computer instructions that control the overall functions and operations of the server and execute the betting operations while in communication with the network interface or input/output device 203 until the user input device 207 is in communication with the LSB bet engine platform 201 through the shared network website or user request search engine 212.

The user input device 207 may communicate with the server 214 or aggregator 204 through a user interface module 213. The server hosts and operates the shared network website or aggregator 204. The user input device 207 communicates with the server 214 after the aggregator program aggregates media and data communications received from the LSBs through a user the network interface 203. Alternatively, it may communicate through another dedicated server, or a website interfaced with the funding portal 208 or membership portal 209. The user input device 207 may also transmit bets to the LSB bet engine 201 through configured with a user request search engine 212, which performs search request analysis and processing, authentication of the location of the user input device, and/or determining whether there are certain restrictions placed on the bet data or betting activities for the user's input device.

The servers respond to user requests to retrieve appropriate files from stored or interconnected data sources, organized in the data structures or data formats discussed further below. Memory 211 of the betting platform and storage 210 processes, memorializes, and may store the betting transactions (e.g., between the user input device 207 and the LSB betting engine 201). The memory 211 dictates the amount of storage 210 that it needs to be available. These same transactions through the system can be replicated and stored in the memory 205 and storage 206 of the shared network website or aggregator 204 (on the server 214). The stored data may include the identification of a sporting event, its date, the LSB associated with the bet, and bets placed or that are pending, lost, or won. Additionally, one or more user interfaces may be located on computer systems coupled through a network with the computer system(s) storing data 206 of the user, such as user identification, account, and membership subscription information. In some embodiments, the shared network website or aggregator 204, and the network interface or network input/output device 203 may be a group of two or more devices interconnected by one or more segments of transmission media or active communications equipment on which data communications may be exchanged between the devices. The shared network website or aggregator 204 aggregates the data for user requests from the LSB bet engine platform (or multiple LSBs), allowing more efficient processing and enhanced/optimized single-ticket processing and functionality in accordance with the described embodiments of the invention.

The LSB member portal 209 and LSB funding portal 208 may be also present in some embodiments, communicating with the server 214 and the LSB betting engine platform 201, to facilitate membership processing for the users connecting to the shared network website or aggregator 204 on the server 214, and also providing funding to the LSBs (for the placed bets by the users), which may be required for some embodiments.

Referring to FIGS. 1 and 2, the shared network 112 enables the input device to be configured with multiple LSB Betting Engines 102, 104, 106, and 108 as opposed to a single bet engine used in conventional stand-alone sportsbooks. As a result, the executed computer program enables the processor and the system to facilitate the user of the sportsbook software to request, compare, and bet odds from multiple sportsbooks utilizing a single website.

Moreover, using an intermediary LSB-Shared Network allows the computer program to memorialize the betting transactions in not only the memory 211 of the shared network sportsbooks' bet engine platforms, but also in the shared network website 205, as well and stored in the shared network 206 and also in the LSB betting engine platform 210.

Any single component or collection of multiple components of a computer system, for example, the computer system described in relation to FIG. 2, that perform the functions described above with respect to describe or reference the method can be generically considered as one or more controllers that control the above-discussed functions. The one or more controllers can be implemented in numerous ways, such as with dedicated hardware, or using a processor that is programmed using microcode or software to perform the functions recited below.

Further, on each of the one or more systems that include one or more components shown in FIG. 2, each of the components may reside in one or more locations on the system. For example, different portions of the components of the system contained in FIG. 2 may reside in different areas of memory (e.g., RAM, ROM, disk, etc.) on the system. Each of such one or more systems may include, among other components, a plurality of known components such as one or more processors 202, a memory system 211, a disk storage system 210, one or more network interfaces or input/output devices 203 and shared network website or aggregator 204, and one or more busses or other internal communication links interconnecting the various components. The storage systems 210 and 206 typically includes a computer readable and writeable nonvolatile recording medium in received data and input are stored and may also provide access to this data for the computer programs executed by the processor, operating on the information stored on or in the medium. This memory could be a volatile, random-access memory such as a random-access memory (RAM), a dynamic random-access memory (DRAM), a static memory (SRAM) or some external memory or device. It may be located in storage system 210 or in memory system 211.

The processor 202 generally manipulates the data within the integrated circuit memory 211, and then copies the data to the medium after processing is completed. A variety of mechanisms are known for managing data movement between the medium and the integrated circuit memory element, and the invention is not limited thereto. Nor is the invention limited to a particular memory system or storage system. The processor 202 and server operating system together define an LSB computer platform 201 for which application programs in high-level programming languages are written. It should be understood that the invention is not limited to a particular computer system platform, processor, operating system, or network. Also, it should be apparent to those skilled in the art that the present invention is not limited to a specific programming language or computer system. Further, it should be understood that other appropriate programming languages and other appropriate computer systems could also be used.

In the configuration and communication system shown in FIG. 2, the funding and membership to the sportsbook is necessary. The LSB Member Portal 209 is used for the aggregated member processing, aggregated from the user input device(s) 207, through the shared network website or aggregator 204. The LSB Funding Portal 208 is used for the aggregated funding processing, aggregated from the user input device(s) 207, through the shared network website or aggregator 204.

Figure 15:
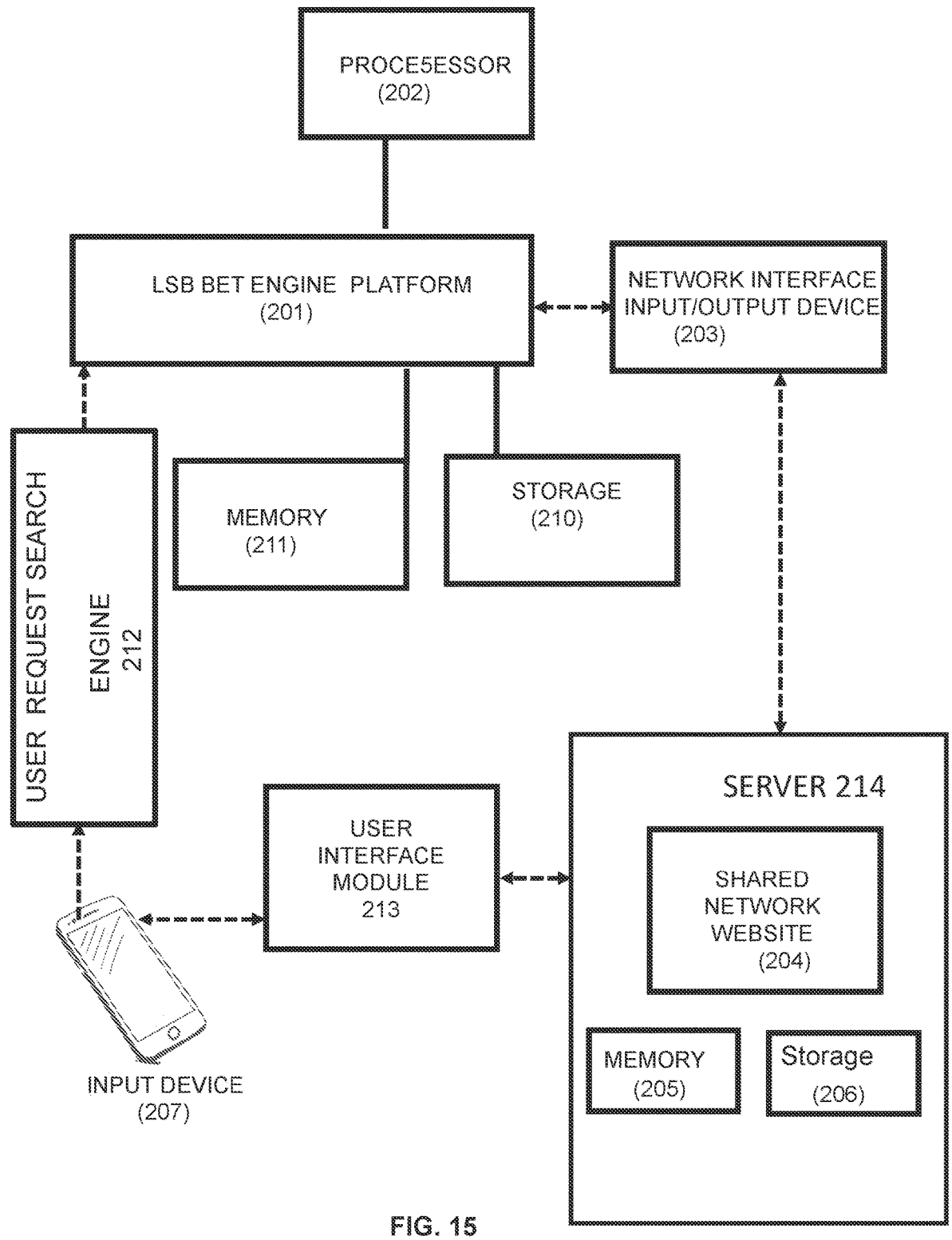
FIG. 15 is a schematic block diagram showing components of an LSB betting system in accordance with various embodiments of the invention in which the user interface from a user device to a SWM shared network website are used for membership and funding processing for certain embodiments.

In an alternative embodiment, shown in FIG. 15, the membership and funding processing proceed through the user interfaced module 213 to the shared network website 204 on the server 214, and are transmitted to the LSB bet engine platform 201 though the network interface or input/output device 203, as shown in FIG. 15.

The computer betting program is enhanced by the shared network facilitating the user to not only request odds of event periods but further decrease search time by enabling the user to request the multiple sportsbooks for the best odds of a side 312 to an event. (e.g., the user woke up on Sunday morning and was determined to bet the Eagles for the first half and was only concerned to find the best line for that side of the event and period).

Process Flow

Figure 7:
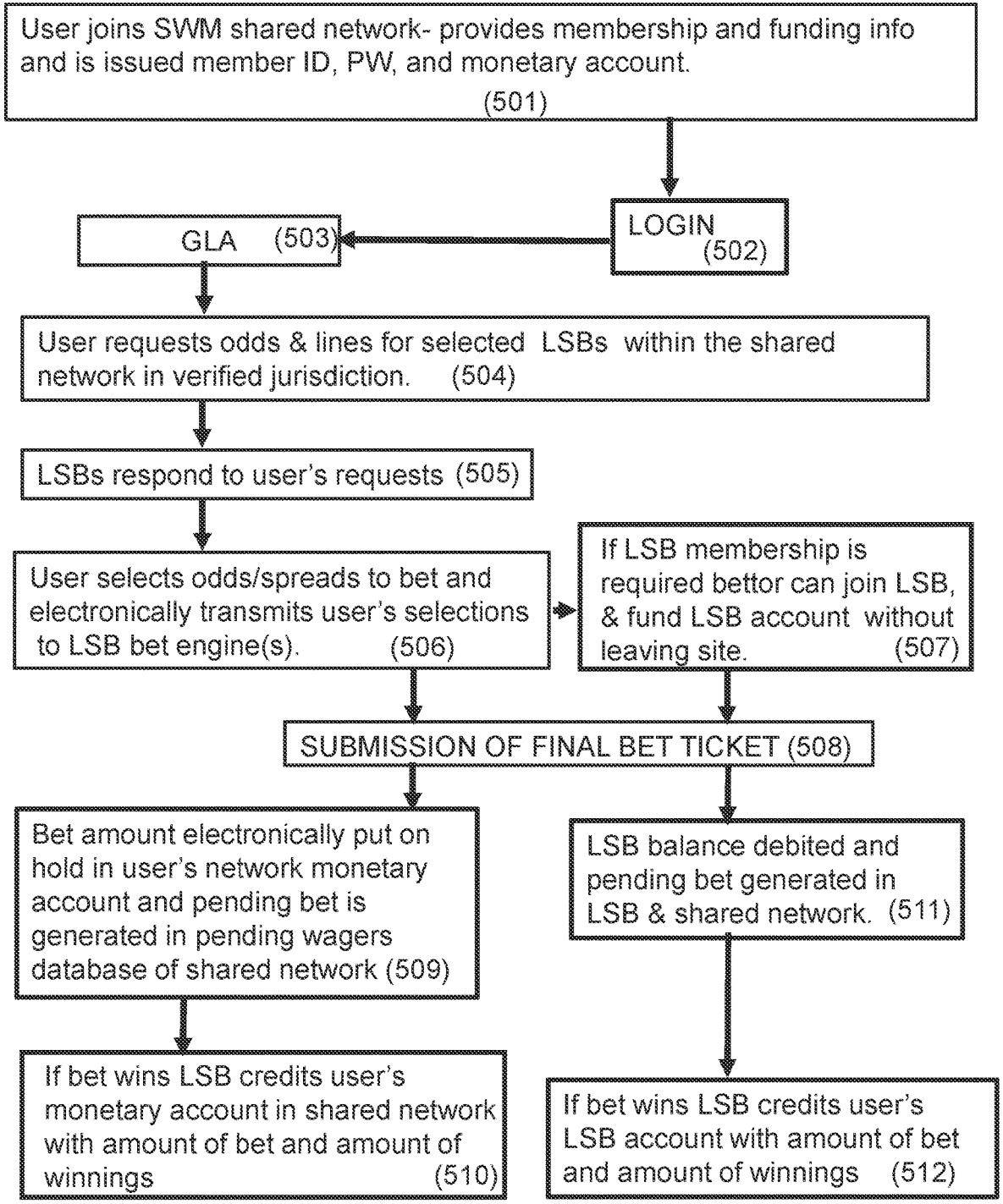
FIG. 7 is a schematic flow chart of a process for placing bets on sports and other events according to certain embodiments of the invention.

The process flow chart of FIG. 7 illustrates an example of a process for conducting sports event betting with multiple LSBs according to certain embodiments of the invention.

In one embodiment, the user views and places bets with multiple LSBs from odds displayed in the shared network as a member of the shared wagering network, without the need to become a member of the LSBs. In the other embodiment, the user is required to be a member of the LSB to place bets. The flow chart process of FIG. 7, including the steps thereof individually or in combination, may be implemented using computer program, stored in a nonvolatile computer signal storing medium, an integrated circuit memory element, or a combination thereof. Such computer program or/and combined the ASIC-based circuitry may implement the logical program progression and define instructions, for example, as part of one or more programs, that, by being executed by a computer, instruct the computer to perform one or more of the methods or acts described herein, and/or various embodiments, variations, and combinations thereof. Such instructions may be written in any of a plurality of programming languages, for example, Erlang, Java, Visual Basic, C, C#, or C++, Fortran, Pascal, Eiffel, Basic, COBOL, etc., or any of a variety of combinations thereof. The computer-readable medium on which such instructions are stored may reside on one or more of the components of a computer system described above or may be distributed across one or more of the components thereof.

As presented in FIG. 7, a user may join an SWM system or a shared network as a member 501 to view and compare odds and place bets on sporting events or non-sporting events with one or more LSBs within the shared network. In one example, the player could access the shared website utilizing an interface (e.g., a graphical user interface (GUI)) in which the player may log on to the shared network 502. This interface may be, for example, used to access the website or Internet, or may be another interface (e.g., an interface used to access a download website used for downloading betting software). The interface may be, for example, an HTML-based, Java-based, or other type of user interface, allowing user ID and password protected access to a resource. It may also utilize double-security access, by sending a unique and random number to be generated and sent the user device and/or requiring entry of this number in order to allow access.

Geographical Location Authentication

Figure 3:
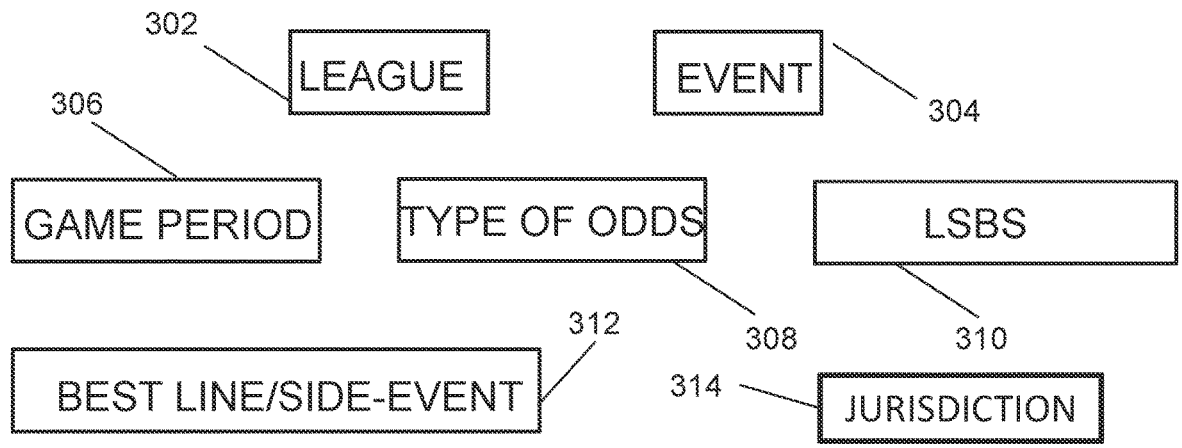
FIG. 3 is a block diagram and illustration showing exemplary components, data structures and organization of an odds request that could be used by a user to submit to the shared network/website in certain embodiments of the invention.

The login 502 could include the shared network GLA server 2160 verifying the physical location, or jurisdiction of the user's input device through Geographical Location Authentication, (GLA) 503 where the program is configured accordingly so that the jurisdiction 314 of FIG. 3 indicates the user's input device's physical geographical location and limits the view of certain odds and spreads of LSBs to LSBs within the physical jurisdiction from which the user logged into 502 so as to conform with US Federal Law.

Figure 21:
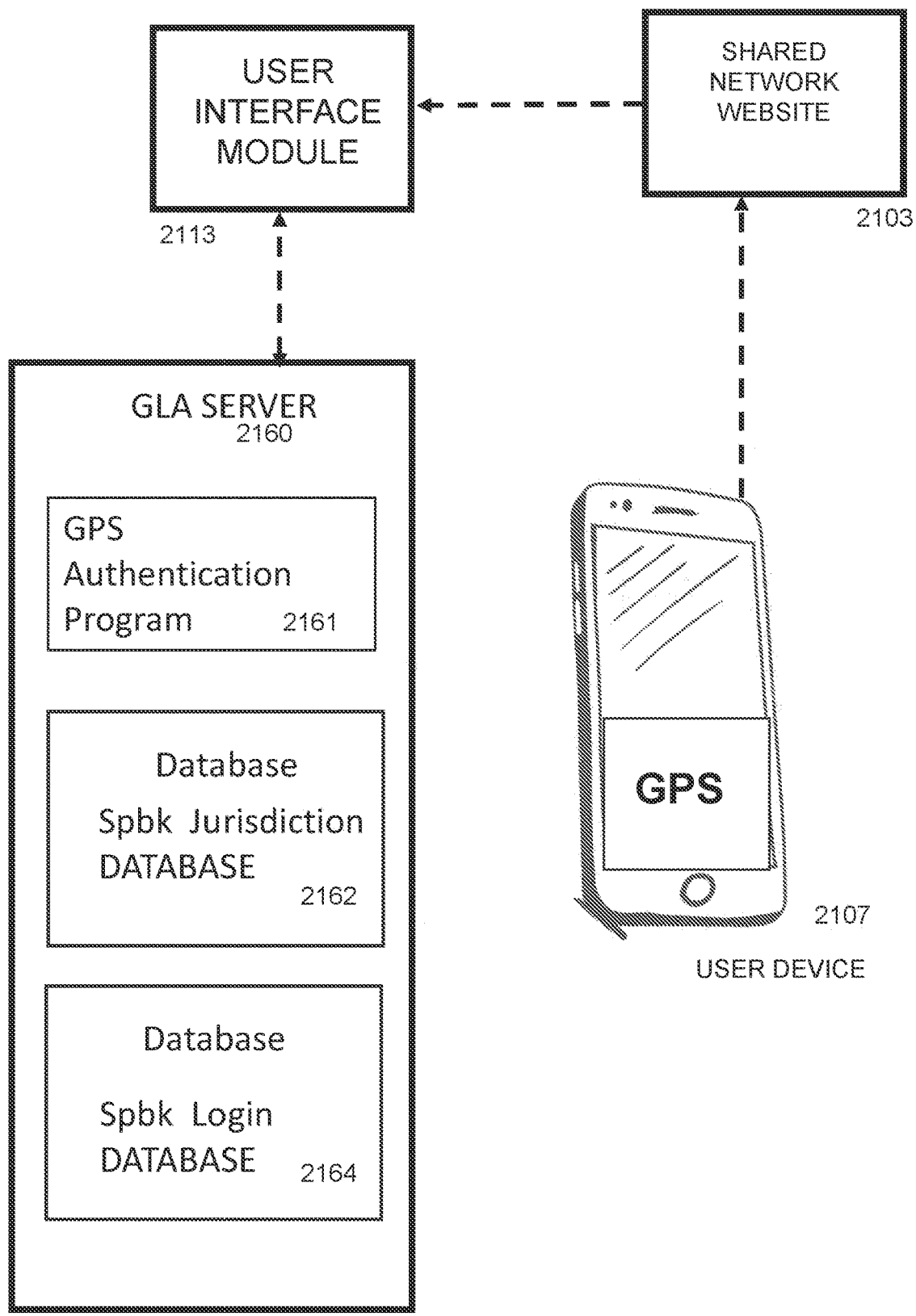
FIG. 21 illustrates use of GPS positioning as part of GLA processing in certain embodiments.

The GLA processing using GPS positioning is further described with reference to FIG. 21. The user mobile device 2107 is equipped with and enables GPS positioning. The GLA server 2160 executes a computer program that may use GPS position for authentication and identification of the user and/or the mobile device 2107. It may further access the sportsbook login database 2162 to extract and automatically analyze and compare the login history for the user. It may also access sportsbook jurisdiction interface and obtain the restriction or requirements for one or more jurisdictions. In certain embodiments, the GLA server 2160 communicates and send information to the shared network website 2103 through a user interface module 2113. The user may communicate with and send information or requests directly to the shared network website, or also through the user interface module 2113 (not shown in FIG. 21).

Restricting Access and Certain Betting Activities for Certain Individuals

Figure 14:
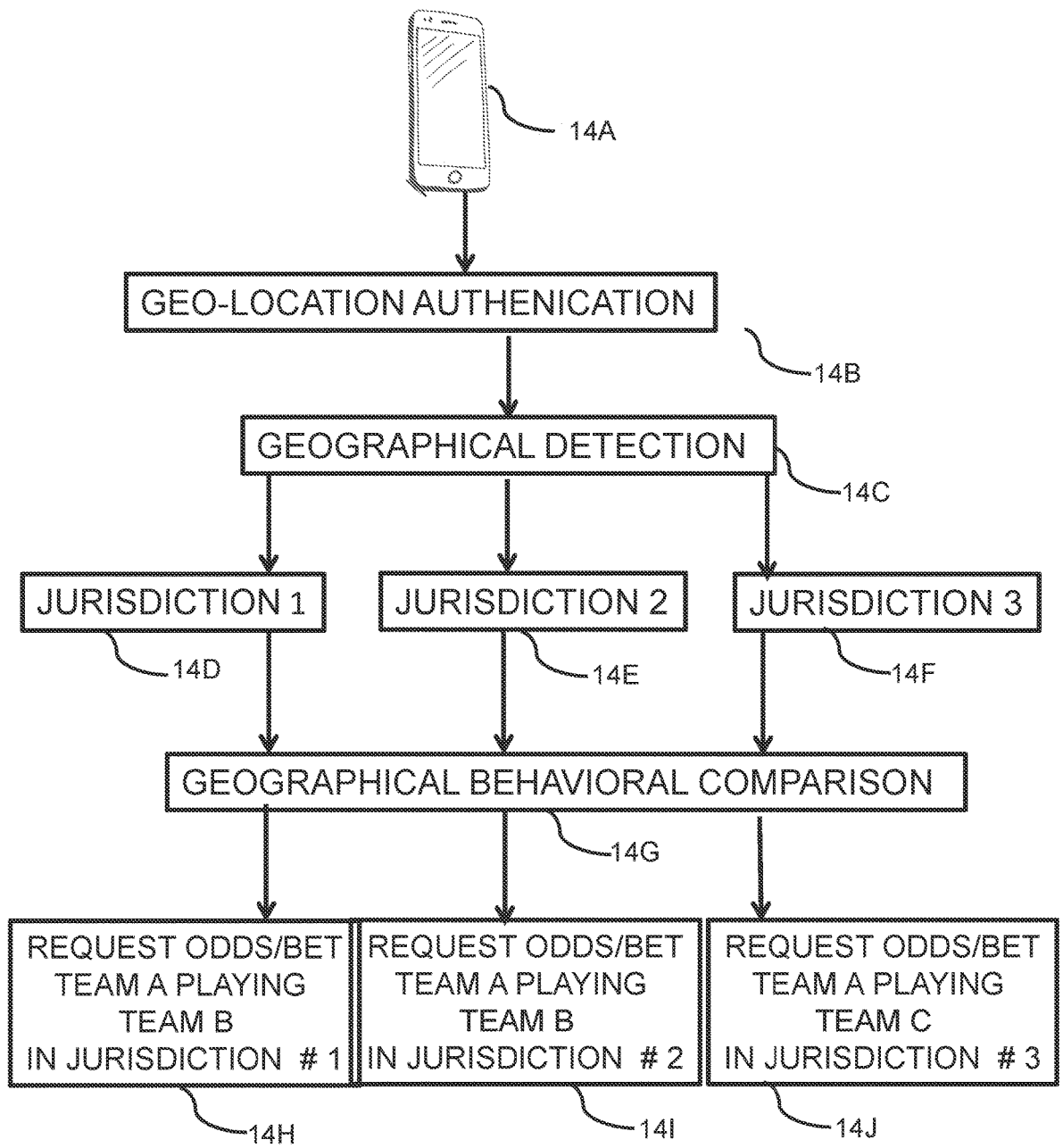
FIG. 14 is a schematic flow chart of a system and method of performing Geographical Behavioral Comparison and detecting persons related to teams of leagues viewing lines and placing bets in certain embodiments of the invention.

A flowchart in FIG. 14 illustrates a method to identify players and coaches, or other individuals who may be restricted from betting on sporting events in violation of league rules or some other laws, regulation or restrictions. The user logs in to the site with an input device 14A. A Geographical Authentication 14B processing takes place by the shared network website, where the geographical location of the user and/or the user input device is detected at 14C. In some embodiments, the Geo-Location Authentication may utilize GPS or other location services to determine the location of the input device 14A. Subsequent logins by the same input device from multiple jurisdictions 14D, 14E, and 14F may trigger the shared network to conduct a Geographical Behavioral Comparison 14G. If it uncovers that odds were viewed or bet on in jurisdiction #1 with team A playing Team B 14H, in jurisdiction #2 with Team A playing Team B 14I, and in jurisdiction #3 with Team A playing Team C 14J. It may then determine that the user is affiliated with Team A. Further, Geographical Location Authentication can be narrowed down to the location of a stadium or arena, where coincidentally many LSBs have their physical walk-up bet shops.

Figure 22:
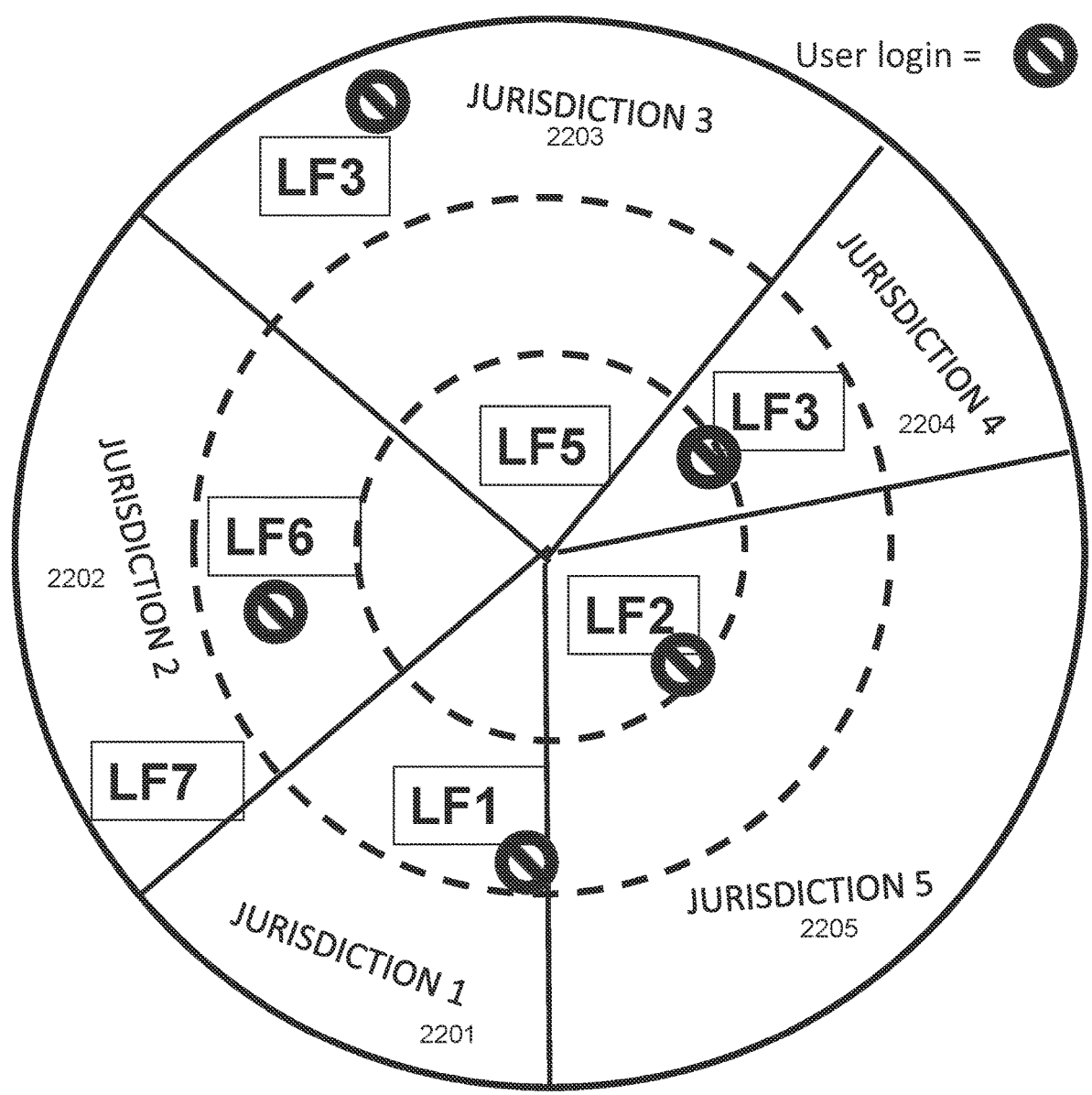
FIG. 22 depicts a visual illustration of GLA processing of multiple logins from different geographic or legal jurisdictions in accordance with certain embodiments.

The GLA data analysis and automated processing and determination of logins is illustrated with reference to FIGS. 22 and 23. Referring to FIG. 22, a particular user may have placed multiple logins (LF1 through LF7) to the League Facilities (LF). The computerized system of the present invention may obtain the login information from the sportsbook database 2164 in FIG. 21. It may also obtain geographic information about Jurisdictions 1-5, 2201-2205, respectively, in FIG. 22. The geographic information may be obtained from the sportsbook jurisdiction database 2162 in FIG. 21. Then the computerized system may evaluate one or more restrictions, permission, or rules for the jurisdictions, and compare the geographic GPS-based location of each login with the jurisdictional requirements or rules for the neighboring geographic areas.

Figure 23:
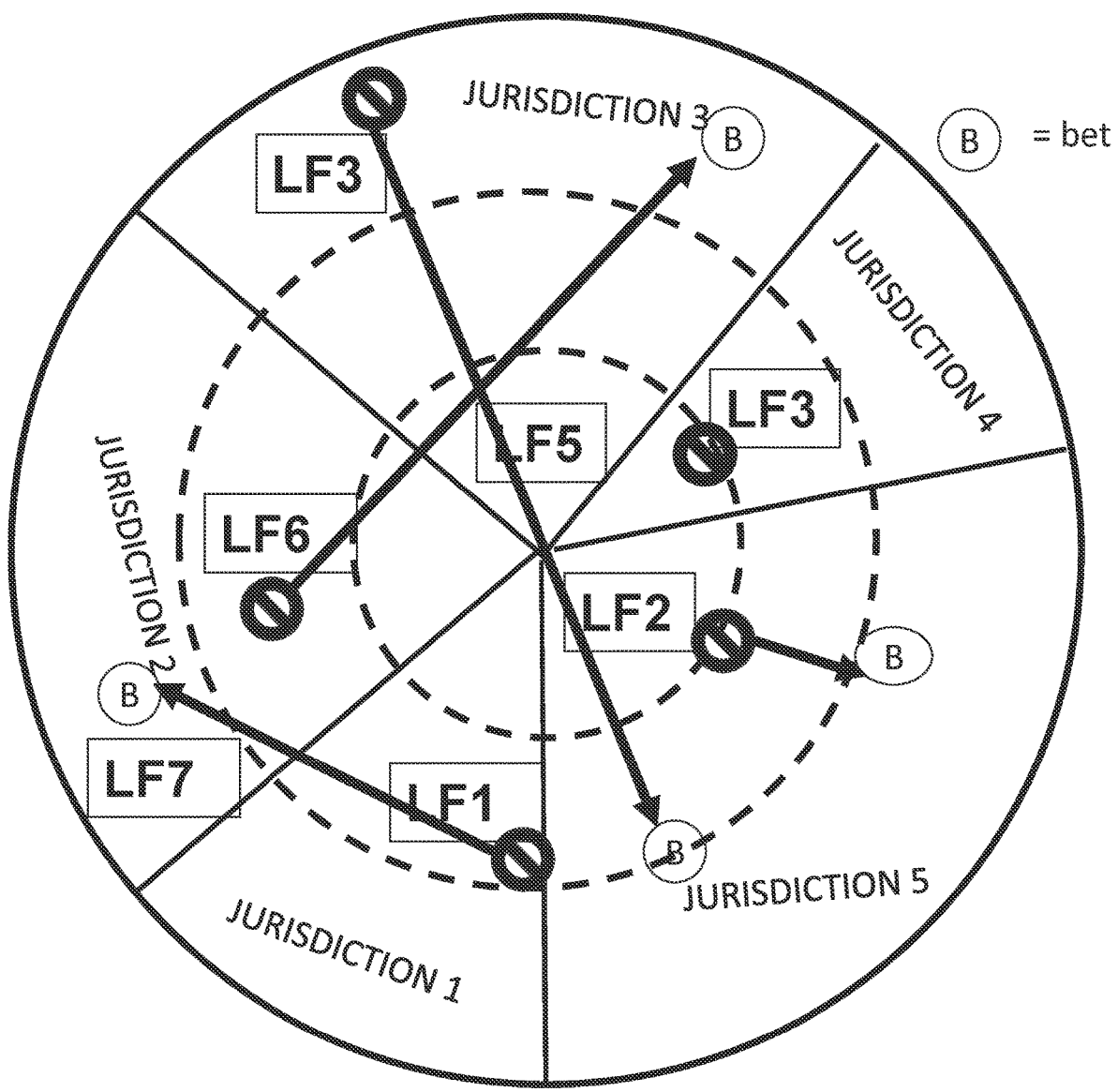
FIG. 23 depicts a visual illustration of processing of bets from different geographic or legal jurisdictions shown in FIG. 22 in accordance with certain embodiments.

The placement of the bets within the jurisdictions 1-5 is further illustrated in FIG. 23. As shown, the system evaluates the betting locations against the logins and geographic information for each jurisdiction 1-5 and determines whether any of the bets B1-B4 in FIG. 23 should be restricted or not permitted to be processed. In other words, when it is determined using GPS positioning or other positioning methods that the same device logs into multiple jurisdictions and the proximity of the logins from the League Facilities (LF) is close, then some bets are made outside the Geographic Authentication Location to LFs. The term League Facilities includes team headquarters and business addresses of organizations that are involved with hosting events in which bets are placed. This could be taken as an indication that the user might be team personnel betting on other sports, or other teams. In such cases, the betting may be restricted, or additional authentication and identification steps may be requested from the user when placing bets, such as providing images of identification documents and activating the mobile device and enabling taking and transmission of facial images or voice for identification or confirmation of the user's identity.

In other embodiments, the shared network may utilize biometric identification information about the user, such as digital fingerprints and determine the person's identity by comparing to previously stored biometric identification information of a person who is affiliated with the team. Alternatively, the shared network may require the user to allow access to the camera on the mobile device, send computer code or instructions to the mobile device to take digital image of the user (i.e., facial features) and transmit the image to the shared network server. Once received, the server may digitally compare the received image of the user with the known images of coaches, players, and others, and automatically determine whether the person is restricted from making the specific bets.

Referring to FIG. 7, after logging in to or accessing the shared network/website 502 the user could request odds and spreads from LSBs of the shared network/website 504. The LSBs respond to the user's request 505. The user then selects the odds or spreads to bet and electronically transmits the selections to the corresponding LSB bet engines 506. In one embodiment, where the user is not required to become a member of the LSB, the bets can be submitted to the final ticket and bet amounts electronically will be put on hold in the user's monetary account 509, and pending wagers will be generated in the databases of the shared network as well as in the databases of the individual LSBs 509.

In another embodiment, where the membership to the LSBs is required, the user can join and fund the LSB account while placing bets 507, after which the final betting ticket is submitted 508, and the bets are generated in a pending database at the individual LSBs as well as the shared network and the bet amounts are debited from the user's LSB accounts 511. Winning bet amounts and the amount debited to place the bet are credited either in the user's monetary account 510 or the user's LSB account 512, depending on whether the user is required to be a member of the LSB.

Examples of User-Requested Odds, Spreads and Totals

Figure 24:
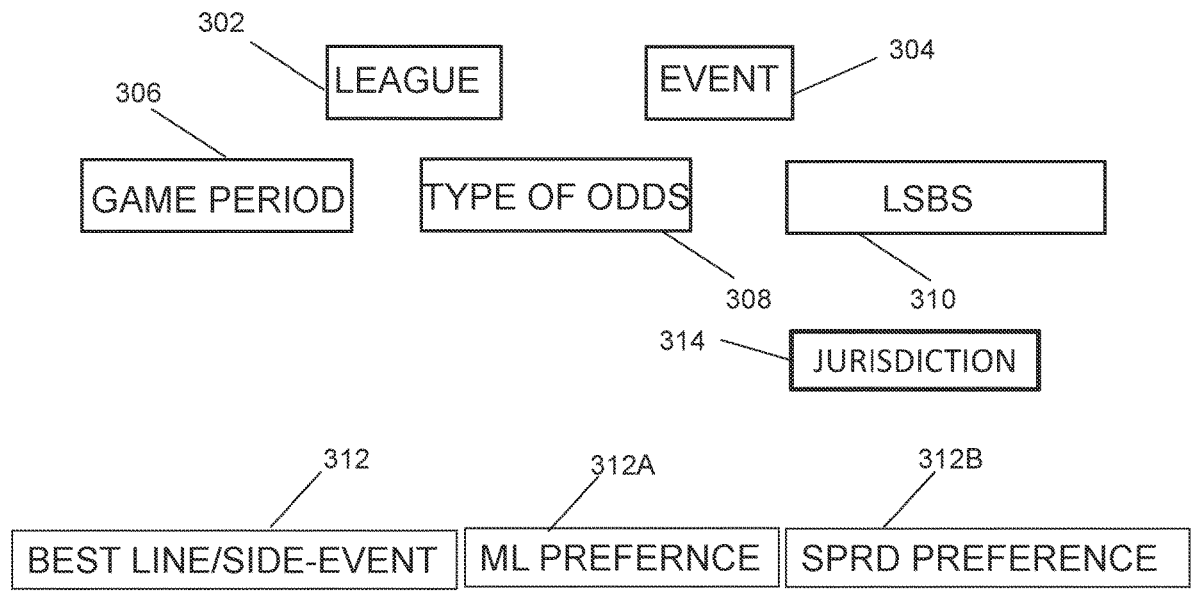
FIG. 24 is a block diagram and illustration showing exemplary components and data structure and organization of an odds request that could be used by a user to submit to the shared network/website in certain embodiments of the invention for the favorite and underdog preferences.

The user could request odds, spreads, and totals in the shared network/website of the present invention using an odds request page for data structure, organization and functions illustrated in FIGS. 3 and 24.

Certain criteria and input data is entered by the user (through the user mobile device) and transmitted for processing to the SWM shared network/website. This input data may include the identification of a league 302 (e.g., National Basketball Association (NBA), National Football League (NFL), Major league Baseball (MLB), National Hockey League (NHL), Canadian Football League (CFL), Women's National Basketball Association (WNBA), Major League Soccer (MLS), International League Sports, or College Sport), an event 304 (e.g., the teams or athletes competing in the event), a game period 306 (e.g., FG, 1H, 1Q, 2H, IG etc.), a type of odds 308 (e.g., ML, SPRD, or TOT.), the one or more LSBs that are requested for odds 310, within the legal betting jurisdiction assigned by GLA 314.

For illustrative purposes shown in FIG. 3, the computer program is in configuration with all LSBs within the physical jurisdiction where the user is logged in 314. As further illustrated in FIG. 3, the user requests odds from the NFL league 302, for the game periods 306 1H-SPRD (e.g., the first half spread), FG-SPRD (e.g., the full game spread), 1H-T (e.g., the first half total), and FG-ML (e.g., the full game money line) for the Philadelphia/New York event 304 (PHL/NYG). The first column to the left headed by 304/306/308 comprises the event 304 and the game period 306 and the type of bet 308 for the four selected odds, spreads and totals requested. In the illustration the user had requested four different LSBs 310 within the jurisdiction 314 (for example, LSBs 310A, 310B, 310C, and 310D) being posted at the top of the columns, and each of the posted LSBs responding to the odds requested by the user. The LSBs 310 selected by user to respond to requests could be embedded in a GUI scroll that is programmed to limit the content (e.g., odds) that can be viewed by users to those of LSBs within the users' physical jurisdiction 314.

In FIG. 3 event period spread responses 315, 316, 317, 318, 319, 320, 321, and 322 are sent by each LSB, and are received from the LSBs by and displayed on the user's mobile device. The examples of provided LSB responses are illustrated in FIG. 3 by three letters F/S/V to denote the team favored (e.g., F), the spread (e.g., S), and the vig (e.g., V). Event period totals 323, 324, 325, and 326 can be designated by total points, runs, or goals scored or accumulated per period or TOT. PTS/P. Money Lines (ML) 327, 328, 329, and 330 for any event period can be shown for both the money line of the favorite (e.g., F/ML) and the money line of the underdog (e.g., U/ML).

In another embodiment, the user could request the SWM shared network/website for the LSBs to provide and display the most favorable odds or spread to a designated side of an event 312. The "sides" of an event comprise the two teams or individuals participating in an event: the underdog and the favorite; or the outcome of a propositional position, (e.g., the user is seeking only the most favorable betting odds to bet one designated team, athlete, or side of a proposition in an event). This could be accomplished by the user placing the odds request for the best line/side of the event 312 using all or specific participating LSBs 310 after entering the necessary criteria of game period 306, league 302, type of odds 308, and event 304.

Data organization, structure, and operation of the LSB platform and display of the up-to-the-moment best odds for a specific side 312 is further illustrated with reference to FIG. 6. The user requests two LSBs with the most favorable full game (FG) money line (ML) 600 to bet the Philadelphia side 601 of the Philadelphia/New York Giants event 600 in the NFL league. The SWM shared network/website of certain embodiments of the invention provides responses 602 and 603 of LSBs 310X and 310Y to the above search and information criteria submitted by the user.

A few examples of electronic responses sent by the four LSBs (LSB 301A, LSB 310B, LSSB310C and LSB 310D in FIG. 4) to the four requests made by user in FIG. 3 (for the period 306, league 302, type of odds 308, and event 304) are illustrated in FIG. 4. The user then selects the most favorable odds, spreads, or totals in the LSB columns depending on the user's position on the event. For illustrative purposes, the responses may include the following: lowest first half spread (e.g., 1H-SPRD PHL/NYG) of 2.5 points 403 is offered by LSB 310C if the user intends to bet the side of the favorite, but the user must risk $130 in vig to win $100. LSB 310B has a larger spread of 3 points to lay for the favorite 402, but a risk of only $100 in vig is required to win $100.

The responses for the full game spread (FG-SPRD PHL/NYG) offers the user the decision to lay 6 points with the normal vig of $110 405 with LSB 310A or to lay only 5.5 points risking $145 407 for every $100 the user wants to win with LSB 310C. If the user intends to bet the combined total of the first half (e.g., 1HT PHL/NYG) to go over (O) then the total of 23 (409) that LSB 310A offered would be the best choice, conversely, if the user intended to bet the under, the total of 24 (411) with LSB 310C would be the most advantageous line for the user. Additionally, the user may request the most favorable total 312 to "specifically" bet the over for the first half total (e.g., 1H-T) of the Philadelphia/NY Giants event (e.g., PHL/NYG) illustrated in FIG. 3 if the user intended to bet the first half "over" and was looking for the most favorable line to do so. This example illustrates the method, system, and data organization for requesting the best odds for a specific side of an event—an innovation that does not exist, and can't be provided, by the presently known systems.

The full game money lines (e.g., FG-ML) offered by each of the four LSBs for the favorites 413A, 414A, 415A, and 415A and the underdogs 413B, 414B, 415B, and 416B for the FG-MLs (e.g., full game money lines) are also illustrated in FIG. 4.

A similar example of the user requesting odds, spreads, and totals in the shared network/website of the present invention is shown in FIG. 24, where the line feed provides the odds for both the favorite and underdog team/player for each event. Where the best "side" of an event contains both a spread and money line the user can specify his preference to a better spread 312A or better ML 321B. (e.g., Team A Laying −6 points −105 or Team A laying only −5. points with a −135 vig.).

Similar to FIG. 4, the full game money lines (e.g., FG-ML) offered by each of the four LSBs (LSB 310A-D) for the favorites 413A, 414A, 415A, and 415A and the underdogs 413B, 414B, 415B, and 416B for the FG-MLs (e.g., full game money lines) are shown in FIG. 25, as a response to the user request in FIG. 24.

Figure 5:
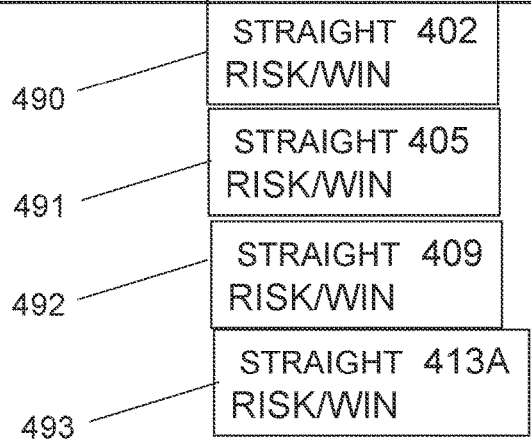
FIG. 5 is a block diagram and illustration showing an exemplary data structure and organization of the bet selections by the user that may be submitted to and processed electronically by the LSBs in certain embodiments of the invention.

FIG. 5 further illustrates the data organization, structures, and processing of different types of bets in accordance with some embodiments of the present invention. FIG. 5, the user selected odds 402, 405, 409, and 413A offered by the respective LSBs using the type of bet designator 429 to designate what type of bet is to be used for each of the bets selected: S (e.g., a straight bet), P (e.g., a parlay bet), or T (e.g., a teaser bet).

The user selected to place straight bets on odds 402, 405, 409, and 413A for the spreads and totals selected as designated in blocks 490, 491, 492, and 493. In another embodiment the user could choose to bet the individual odds selected in any or all types of wagers 429 which include straight bets, parlays, and teasers consecutively to create one final betting ticket as illustrated in FIG. 12. The user inserts the amount to be risked or bet 490, 491, 492, and 493 and then submits the plays 430 to either pend the bets for additional odds selections or go to the final betting ticket illustrated in FIG. 12.

In another embodiment, the user could have requested the best odds for the sides of the wagers placed 490, 491,492 and 493 by the using Best Line/Side-Event option 312 illustrated both in FIG. 3 and FIG. 6.

In another embodiment the user could choose to include two or more of the bets in an exotic wager such as a parlay on the same final ticket as straight bets as illustrated by bets 419, 421, 427, and 415B which were placed in a 4-team parlay at block 700B of FIG. 12. The selections comprising the exotic wager can be selected in the same manner as the straight wagers were selected in FIG. 3 utilizing the type of bet indicator 429 shown in FIG. 10 to designate which selections are to be placed in a straight bet S, parlay (P) or teaser (T) exotic wager.

If the user selected to place the four bets illustrated in FIG. 10 into an exotic wager, the user would have to next select the type of exotic wager 1101, 1102, 1103, and 1104 as illustrated in FIG. 11. In this illustration the user chose to place all of the bet selections in a single 4-team parlay 700 risking a designated amount to win a designated amount. The exotic wager is then electronically submitted 430 to the final ticket 700B as illustrated in FIG. 12. Other exotic wagers can be completed similarly and submitted to the final ticket illustrated in FIG. 12, where straight and exotics wagers will be finalized on a single ticket, an innovation not found in the art today. One of the advantages of the present invention is that the exotic wagers can be combined with other bets, and can also be in the same betting tickets, and processed electronically by the SWM shared network, and produce and calculate payouts to the bettor.

For illustrative purposes shown in FIG. 12, if the user risked $100 to win $1954 700B on the parlay bet, and if all four bets of the four-team parlay were placed at a single LSB and won, the LSB would have to pay the user $1954 plus the $100 risked by the user. However, this could be processed at the Sports Wager Mall (SWM) only if all bets of the parlay were from a single LSB.

Payout Calculations Examples

FIG. 11 shows that three of the bets 419, 427, and 415B consisted of bets made with LSB 310C, and only one bet 421 was bet with LSB 310A. Not only does the user's risk to each LSB participating in the parlay have to be calculated and put on hold in the user's monetary account, but the risk for each LSB participating in the parlay has to be determined. The Sports Wager Mall software is programmed to make these calculations automatically upon confirming the final betting ticket. The user risked $100 so LSB 310A has contributed 25% of the bets to the parlay and stands to win $25 if the user loses the parlay, and LSB 310C has contributed 75% of the bets to the parlay so LSB 310C stands to win $75. If all bets in the parlay had a −110 vig then LSB 310C would have to pay 75% of the winnings to the user and LSB 310A would have to pay 25% of the winnings. Such is not the case in the illustration shown in FIG. 11, as all four bets of the parlay have different vigs: bet 419 has a −130 vig; bet 421 has a −110 vig; bet 427 has a −120 vig; and bet 415B has a +232 vig. T6.

As a rule, the more negative the vig the lesser the payout odds of a parlay will be and positive vigs increase the parlay payout odds. The Sports Wager Mall shared network software is configured to compute the win and payout liability for each LSB contributing individual bets towards the multi-bet parlay, as illustrated in FIG. 11. For example, the payout is computed so that LSB 310C stands to win $75 with a payout liability of 78.4% of the total parlay payout, or $1532, and LSB 310A stands to win $25 with a payout liability of 21.6%, or $422. The user's escrow account would be debited $100 with $75 going to LSB 310C and $25 to LSB 310A if the user lost the bet. If the user won the parlay bet the $100 placed on hold would have been returned to the monetary account balance, and the two LSBs would make the two above payouts to the user's monetary account. Thus, the present system provides automated processing and calculation of a payout to multiple, different LSBs on the same ticket.

Figure 13:
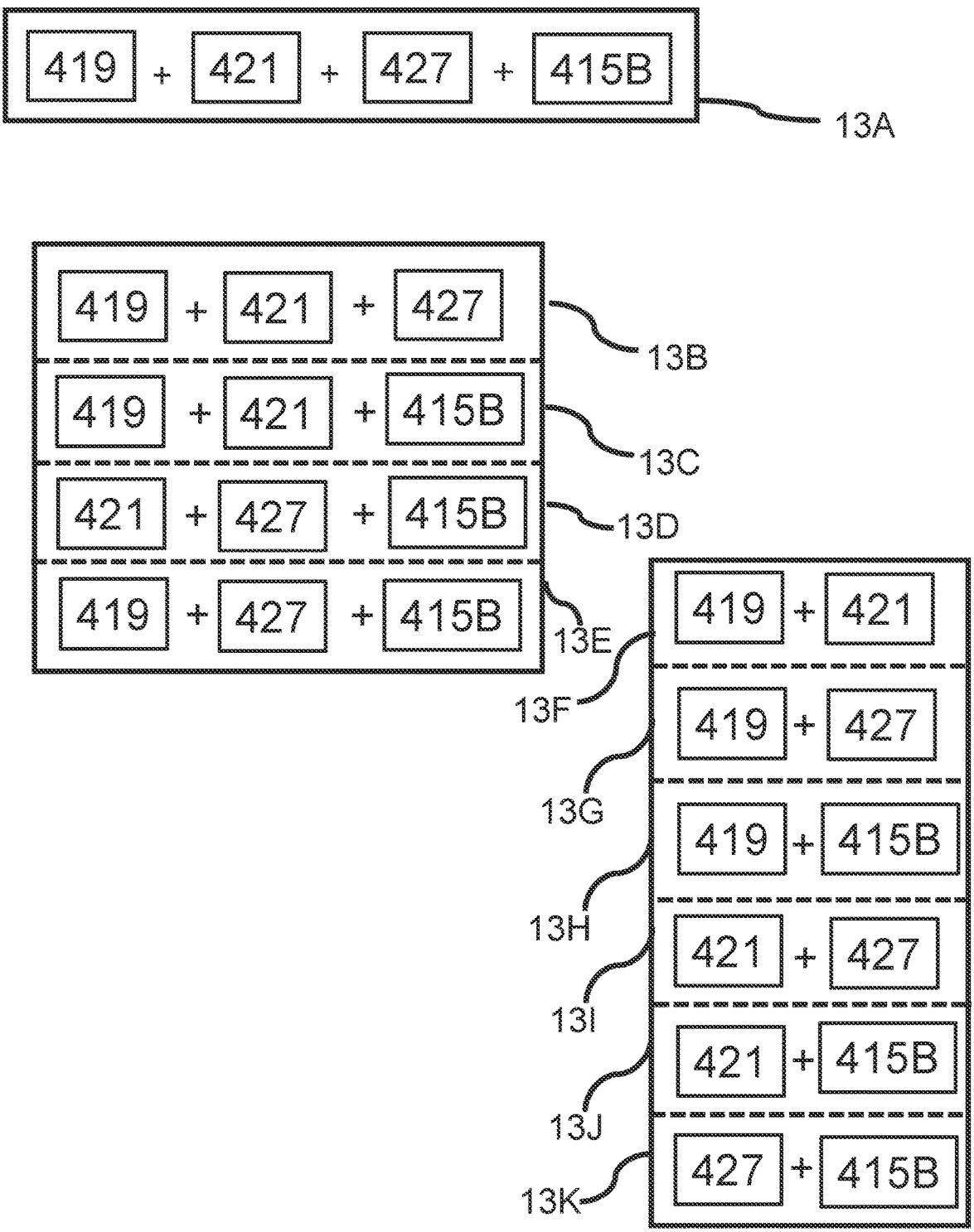
FIG. 13 is an illustrative example of the data structure and organization of data and functional components for the plurality of parlays that could be bet when three of more bets are combined in a parlay exotic wager in certain embodiments of the invention.

FIG. 11 illustrates a simple example of a single 4-team (one bet consisting of 4 teams or 4 bets) 700, but the user could place these bets in another type of parlay 1101, 1102, 1103, and 1104 such as a 4-team Round Robin Parlay wherein there would be up to eleven separate parlays, which can be calculated as Illustrated in FIG. 13. One bet parlay comprises bets: 419, 421, 427, and 415B as illustrated in block 13A, and four other parlays of three bets using combinations of bets 419, 421, 427, and 415B as shown at block 13B, 13C, 13D, and 13E. Six parlays of two bets using combinations of bets: 419, 421, 427, and 415B are shown at blocks 13F, 13G, 13H, 13I, 13J, and 13K of FIG. 13.

Referring to FIG. 13, the computerized system may calculate the sportsbook risk and win on parlays and bets 419, 421, 427 and 415B for LSB 310C, 310A, 310C and 310C, respectively.

Risks on Parlays:

| | |
|---|---|
| TEAM 419 − 130 | LSB 310C |
| TEAM 421 − 110 | LSB 310A |
| TEAM 427 − 120 | LSB 310C |
| TEAM 415B + 232 | LSB 310C |

In performing risk calculations and analysis, the computerized system may convert the negative ML odds to decimal odds, and add on 1 (e.g., 100/130=0.77+1=1.77) (when converting plus ML odds just add 1) 2.32=3.32. Then, it can multiply each decimal odds by each other and amount bet and subtract amount bet from final number. For example, $$1.77 \; 1.91 \times 1.83 \times 3.32 \times \text{Bet amount} - \text{amount bet} = \text{Total Parlay Payout}.$$

In further calculating risk percentages for each participating Sportsbook, the system may divide each individual decimal odds by total decimal odds. For example, 1.77/(1.77+1.91+1.83+3.32)=% of risk of total payout for each odds contributed.

Therefore, LSB 310C is risking 20% to the total payout for just their bet on Team 419 in a four-team parlay. Of course, they have contributed more bets to the parlay, and each contribution (bet) must be calculated.

A calculation is computed for each LSB contributing bets to the parlay for potential win and payout liability for eleven parlays by the shared wagering network software. Presently, there are no known methods or systems where multiple LSBs contribute separate bets to a single exotic wager, as in some embodiments of the present invention.

As for teasers, the multi-bets can only consist of full game spread (FG-SPRD) of sporting events therefore only bet 421 of FIG. 11 qualifies to be included in a teaser wager. LSB win and liability in a teaser wager is calculated as each team spread of a game is adjusted by decreasing or increasing the spread to the user's preference, and the odds of the payout are set based on the number of teams used and the number of points that the spread is adjusted. For example, a teaser consisting of seven teams with an adjusted spread of seven points could pay up to 6-1 odds or $600 for every $100 bet regardless of the vig on each individual bet.

For example, if a user placed the above teaser example, and selected one team from seven different LSBs each LSB would stand to win $14.28, and each LSB's liability to the teaser payout would be $85.71, if none of the teams lost or pushed.

One of several advantages of the automated system of the present invention is that it allows users to place both exotic and straight wagers from multiple LSBs simultaneously on a single wagering ticket utilizing a single keystroke illustrated in FIG. 12 at block 700C. This allows users to get the most up-to-the-minute favorable odds and spreads for both straight and exotic wagers. Presently, at the stand-alone conventional sportsbooks, user exotic and straight wagers are submitted separately. This creates a greater probability that odds could change between the straight bets and the exotic wagers placed by the users. The present system reduces or eliminates this probability by allowing the straight and exotic wagers to be placed on the same ticket.

Even using the Sports Wager Mall (SWM) method described above, there is a chance of line changes even when exotic and straight wagers are submitted simultaneously. In some embodiments, the Sports Wager Mall system and method of the present invention may further reduce this undesired risk. and offers another innovation to better this.

If upon submission 430 of the final ticket as illustrated in FIG. 12 the odds and spreads change, in one embodiment the changes 705, 706, 707, 708, 713, 715, 717, and 720 would appear on the final ticket before submission. Conventional stand-alone sportsbooks only offer the user the option to delete the bet or accept the bet using the changed odds. The shared wager network offers four alternatives for line changes illustrated at 709, 710, 711, 712, 714, 716, 718, and 721 comprising: A, (e.g., Accepting the changed odds) D, (e.g., Deleting the bet) S, (e.g., have the shared network do another Search for the most favorable odds from another LSB) or OS (e.g., user can take the "other side" of the bet from the same LSB) The odds change could make the other side of the event more attractive.

As in conventional LSBs, the user can also buy points for spreads and totals in blocks 705, 706, 707, 708, 713, 715, 717, or 720 before submitting the final ticket 430. The total amount the user is risking winning a certain amount of the combined straight and exotic wagers is illustrated in block 700C. For illustrative purposes if bet 405 changed to −6.5-115 715 the user would have the option 716 to take the other side OS or NYG+6.5-105 vig and for another few cents could buy the spread up a ½ point to NYG+7-120. This is an example of an invention not only offering users the ability to get the best odds but finding the best betting options as well.

Grading/Crediting/Payout

The system can be configured for the LSBs to concurrently declare results of bets final in the respective LSBs and shared network through a process known in the art as "grading" or scoring of the events and props. If the bet wins as illustrated at step 510 in the flow chart of FIG. 7 the user's network monetary account would be credited with the amount risked in placing the bets plus the winnings. If the user is an LSB member, then the user's member account at the LSB would be credited 512. The user's betting history at the shared network as well as the LSB would be electronically updated. Notification of winnings to a user may occur by credits to the network monetary account of the user as illustrated in the flow chart step 510. Notifications of such credits could come from or though the LSB or shared network website, or both.

Member Registration Processing while Betting on an Event

In another embodiment, the user could become a member of one or more of the LSBs while viewing and betting on the events, and the shared network could facilitate funding and membership with the LSBs during the viewing and betting on the events. In this embodiment the user's shared network monetary account can be used to fund the LSB account. Non-members could provide membership and funding information to the LSB at step 507 of the flow chart at FIG. 7 after having placed bets at step 506. This could be accomplished without leaving the shared network utilizing the LSB membership portal 209 and the funding portal 208 which are in communication with the LSB betting engines as illustrated in FIG. 2. For both funding and joining an LSB the user can be in communication with the LSB through pop-ups or other mediums used in the art during the betting process. This betting method, which includes membership registration and funding after placing a bet is not known or utilized with the stand-alone conventional LSB betting systems.

For example, a user could become a member of an LSB while placing a bet as illustrated in FIG. 9, showing the type of bet pending 913 (e.g., a straight bet on 413A risking $270 911, to win $100 912 pending membership to LSB 310A shown in block 604). The user could use the LSB member portal 208 of FIG. 2 to become a member of LSB 310A shown in block 604 of FIG. 9. In one embodiment the user could use the autofill method available in the industry to complete the user information required at block 901 of FIG. 9, which would be stored 206 in the shared network of FIG. 2. An LSB member number 902 would be assigned to the user along with a password 903 and 904 and then the user could activate the account by clicking on "enter" 905 which would generate a new LSB member account with a zero balance 906 and a new window configured with the funding portal 208 could open to facilitate funding of the user's new LSB account.

Thus, the shared network website method of the present invention also facilitates the user to become a member of a network sportsbook without the need to log into the independent sportsbook site, saving time while making a bet through the LSB portal 209 situated between the shared network 204 and LSB betting engine 201 without signing on to the independent LSB website or leaving the shared network website 204.

Funding

The funding process of the new user account according to certain embodiments is described with reference to FIG. 8. In the window illustrated in FIG. 8, a member of an LSB whose LSB account has insufficient funds to complete a pending wager can fund the LSB account. The process shown in FIG. 8 would become available after the user submits the plays at step 506 and before submitting the final ticket at step 508 in the flowchart at FIG. 7 without leaving the shared network.

Referring to FIG. 8, a user who has an LSB account which is deficient in funds to complete a wager made with LSB 310A shown at block 604, with user risking $270 811 to win $100 812 in a straight bet 813 wherein the LSB funding portal found at block 208 of FIG. 2 is configured with the betting engine of LSB 310A of block 604 of FIG. 8. The user could enter his LSB 310A member number at block 604, his password at block 802, the method 805 to fund the account and the currency amount 806 to be funded. The network is also configured to electronically transfer funds from another LSB account 814 that the user is a member of to the account to be funded 815, eliminating the need to fund an LSB account extemporaneously through a fund provider requiring additional fees.

The user then confirms the bet 807 and the member's new account balance on LSB 310A will be shown at block 808 of FIG. 8 after the amount of the bet is deducted from the LSB account (as illustrated at step 511 of the flow chart of FIG. 7). The bet would then be generated within the pending bets' database of both the LSB and of the shared wagering network. The above processes allow funding of sportsbook member accounts, acquiring membership to sportsbooks, transferring funds between member sportsbooks, or using a shared network monetary account to fund a member sportsbook account while placing a bet. This is not currently known or done with the LSBs and known betting systems.

In contrast, conventional sportsbook software requires the user to visit the sportsbook's website to fund a sportsbook account utilizing a third-party processor. In certain described embodiments, the shared network method utilizes an LSB funding portal 208 between the shared network 204 and the LSB bet engine 201 to readily fund a network sportsbook through three methods: a third-party processor, shared network monetary account, or between member sportsbooks of the network while a bet is being made by the user without leaving the shared network website. The use of the embodiment with an SWM monetary account eliminates the need for funding to the network sportsbooks entirely.

In addition, when odds change upon confirming a bet with a conventional sportsbook the user is left with two options: "take it or leave it." In the SWM system and method described in a certain embodiment, because the odds are comprised from multiple sportsbooks, the user has an option to re-search for better odds, or even the option to use the other side of the bet.

History of Bets

In another embodiment, if this bet was the last of multiple bets pending for membership or funding, the user submits 430 the bet as illustrated in FIG. 11, taking the user to the final wagering ticket illustrated in FIG. 12. Open bets 809 and history of bets 810 placed with the LSBs by user through Sports Wager Mall can be found throughout the process as illustrated at the bottom of FIG. 8, facilitated through the memory 205 at storage 206 of the shared network illustrated in FIG. 2. Open bets, pending bets, and history of bets are limited to bets facilitated by the shared wagering network, although that could change if the LSBs had the ownership of, and managed the shared network site. Among other benefits, this system and method improves access to wagering history and faster processing of membership for a user.

Reflecting Grading and Payouts in Betting History

The LSBs declare results of bets final through their grading of the events. If the bet wins as illustrated at steps 510 and 512 in the flow chart of FIG. 7, the user's LSB account would be credited with the amount risked placing the bet plus the winnings. The user's betting history both at the LSB and shared network would be electronically updated. Notification of winnings to a user may occur by credits to the LSB account of the user as illustrated in the flow chart step 512 of FIG. 7. Notifications of such credits could come by the LSB or shared network website or both.

Account Information Interface

In another embodiment, the shared network can be programmed to permit the user to access LSB account information and/or personal information that is stored in the shared network server having a memory 205 and network-stored information/data 206. The account information and/or personal information may include the LSB membership and funding information and data, and other pertinent information required by LSBs for the enrollment process, associated with information that must be provided or is required by LSBs 507. Because odds of LSBs are in constant flux, and the user may lose his chance to favorable odds due to delay, the shared network-stored information/data 206 of FIG. 2 could be sent by the process to the LSBs' bet engine platform 201, through the LSB member portal 209 or the LSB funding portal 208 using autofill method 901 illustrated in FIG. 9. This improves and expedites both the membership enrollment and funding requisites and processing in a time-sensitive period before the user's requested odds become unfavorable.

Another advantage of the aforementioned processing and access is that this permits the user to have access to his account information, and to bet at multiple LSBs using one login and the same information stored 206 on the shared network, although independent LSB password authentications might be required at login and during certain phases of the betting or funding process.

Another embodiment of the invention could be accomplished by one LSB hosting betting lines/odds from one or more other LSBs on their own network/website.

In one embodiment, the shared network/website could provide the participating LSBs with their own store to maintain advertising on their special offerings such as exotic odds, bonuses, or loyalty points for members of their LSB.

Further, the shared network could facilitate blocking the viewing of odds to persons limited or banned by the LSBs.

Using User Interface for Membership and Funding

Figure 16:
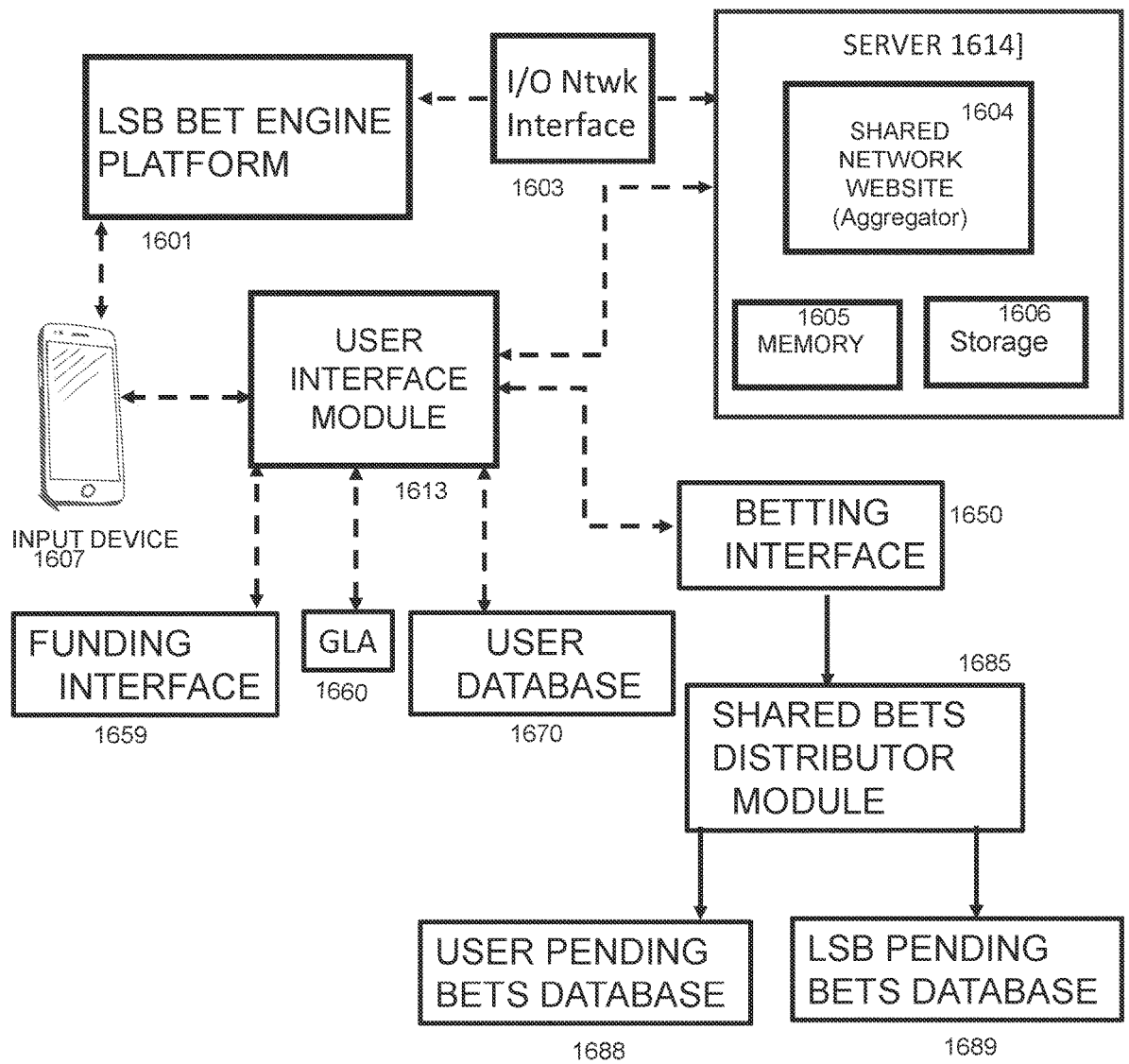
FIG. 16 is a schematic block diagram and flow chart of a system and method of an LSB betting system in which the user interface from a user device to a SWM shared network website is used for membership and funding processing for certain embodiments.

FIG. 16 illustrates an organization and a flow chart of a system and method of LSB betting system in which the user interface from a user device to a SWM shared network website is used for membership and funding processing, which is also shown in FIG. 15. Referring to FIG. 16, the user input device 1607 may communicate with the LSB bet engine platform 1601 directly. However, it transmits membership, funding and requests and processing through a user interface module 1613 (similar to the user interface module 213 in FIG. 15). The user interface module 1613 transmits funding requests to a funding interface 1659. The funding process is described above with reference to FIG. 8. The system and process shown in FIG. 16 can be utilized for funding by a SWM monetary account.

The user interface module 1613 also performs or calls a separate GLA module 1660 to perform Geographical Location Authentication (GLA) processing, which determines user's geographical location and limits user's view and access to certain odds and spreads of LSBs to which the individual can't or should have no access under applicable laws, regulations, or ethical industry standards (like not allowing coaches, players, or judges to bet on the events or games in which they participate). As discussed in more detail above, the GLA processing also restricts certain individuals from accessing or participating in betting activities.

The user interface module 1613 also accesses user database 1670, where it can access or store user's betting history and other user-specific data. In addition, the user interface communicates and transmits user requests to the shared network website or aggregator 1604 on the server 1614 having a memory and storage (similar to a server 214 in FIGS. 2 and 15). The server 1614 communicates with the LSB bet engine platform through an I/O network interface 1603 (similar to I/O network interface 203 in FIGS. 2 and 15).

Figure 18:
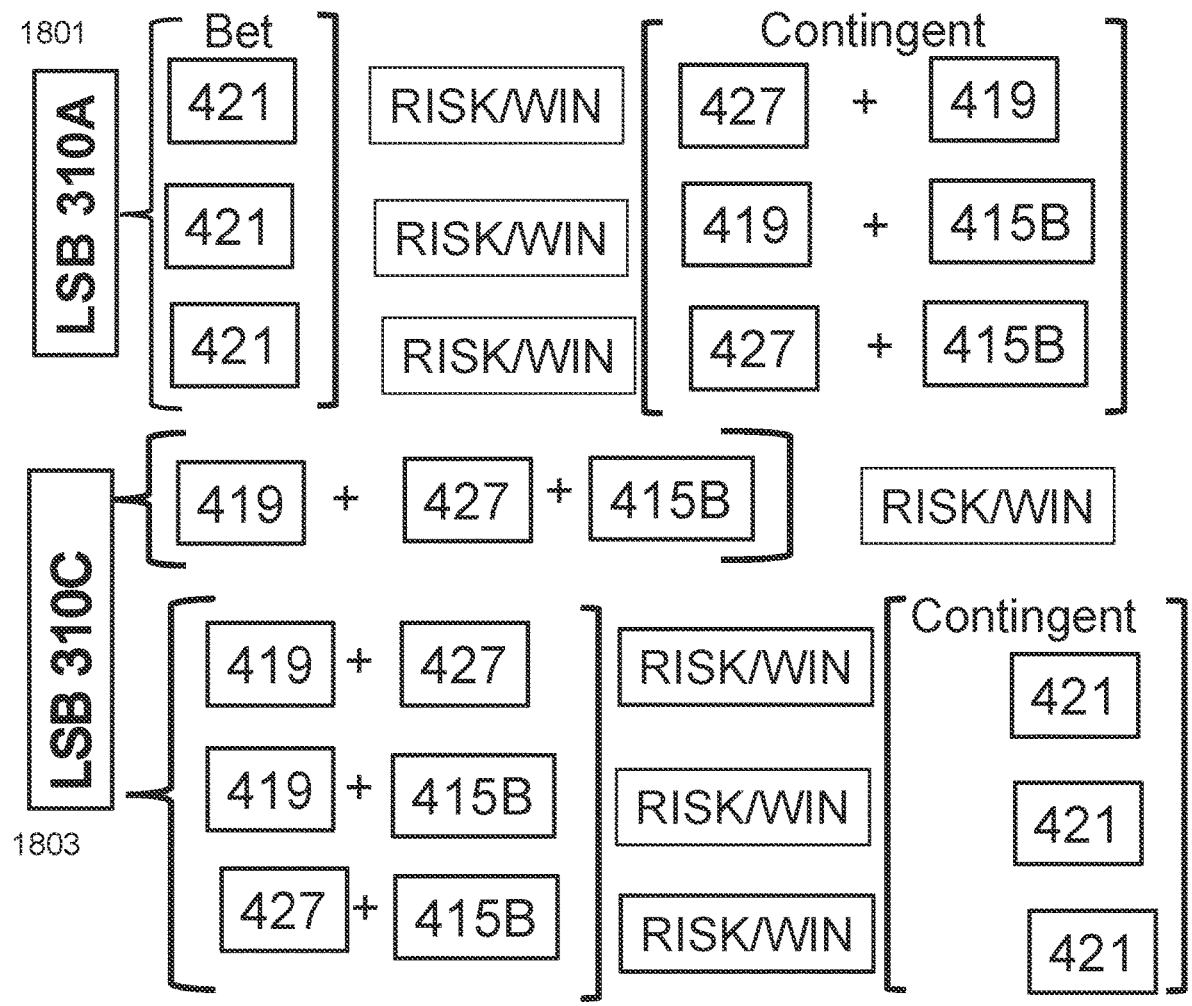
FIG. 18 illustrates the pending bet shown in FIG. 17, as it is encoded to allow the participating sportsbooks to grade bets pending in SWM simultaneously or near in time to the sportsbooks' grading of their own events, according to certain embodiments.

In addition, the user interface 1613 transmits betting requests and bets to the betting interface 1650. Multiple bets of the user may be shared in the shared distributor module 1685, registering and storing shared bets in the user pending bets database 1688 and LSB pending bets database 1689. The bets that are put into the LSB's pending database, as further illustrated in FIG. 18, are encoded in a way that allows the sportsbooks to grade the bets pending in SWM simultaneously or near in time to the sportsbooks' grading of their own events.

The user interface module of FIG. 16 utilizes a plurality of interfaces, and use of these separate interfaces prevents or reduces the risk of comprising other interfaces, and specifically a betting interface containing user-requested odds from network LSBs, a funding interface if bets are placed using a shared network monetary account or if funds are transferred between network LSBs, and a user database for data of user info, pending bets, graded bets, balances with network LSBs.

FIG. 17 illustrates an example of data organization, format and functional structure of a pending bet, or the user parlay bet ticket 1701 that may appear in the user pending bet database 1688 in SWM. It shows a 4-team parlay ticket for bets 421, 419, 427 and 415B. The bets that are put into the LSBs' pending database are encoded, as shown in FIG. 18, so that the sportsbooks can grade their bets pending in SWM simultaneously when they grade the events in their own sportsbooks. Bet 421 is processed and evaluated by the LSB 310A, and the payout is contingent on the other bets 427+419, 419+415B and 427+415B. Similarly, payout for the other bets 427+419, 419+415B and 427+415B, processed by the LSB 310C, is contingent on the 421 bet, as shown in FIG. 18.

FIGS. 19 and 20 illustrate the examples of data organization, format, and functional structure of the four bets in the user four parlay ticket shown in FIG. 17 when the four bets parlay ticket is sent and stored in the LSB pending bet database, to be evaluated by the participating LSBs, namely LSB 310A 1801 and LSB 310C 1803, respectively. In other words, these drawings provide examples of how the bets would be organized and structured in the participating LSBs' sportsbook databases.

The LSB pending bets databased in SWM is tagged, so that LSBs participating in the bets can grade their bets pending in SWM. This allows for faster grading of shared bets.

Financial Monitory of User Funds and Monetary Accounts

Figure 26:
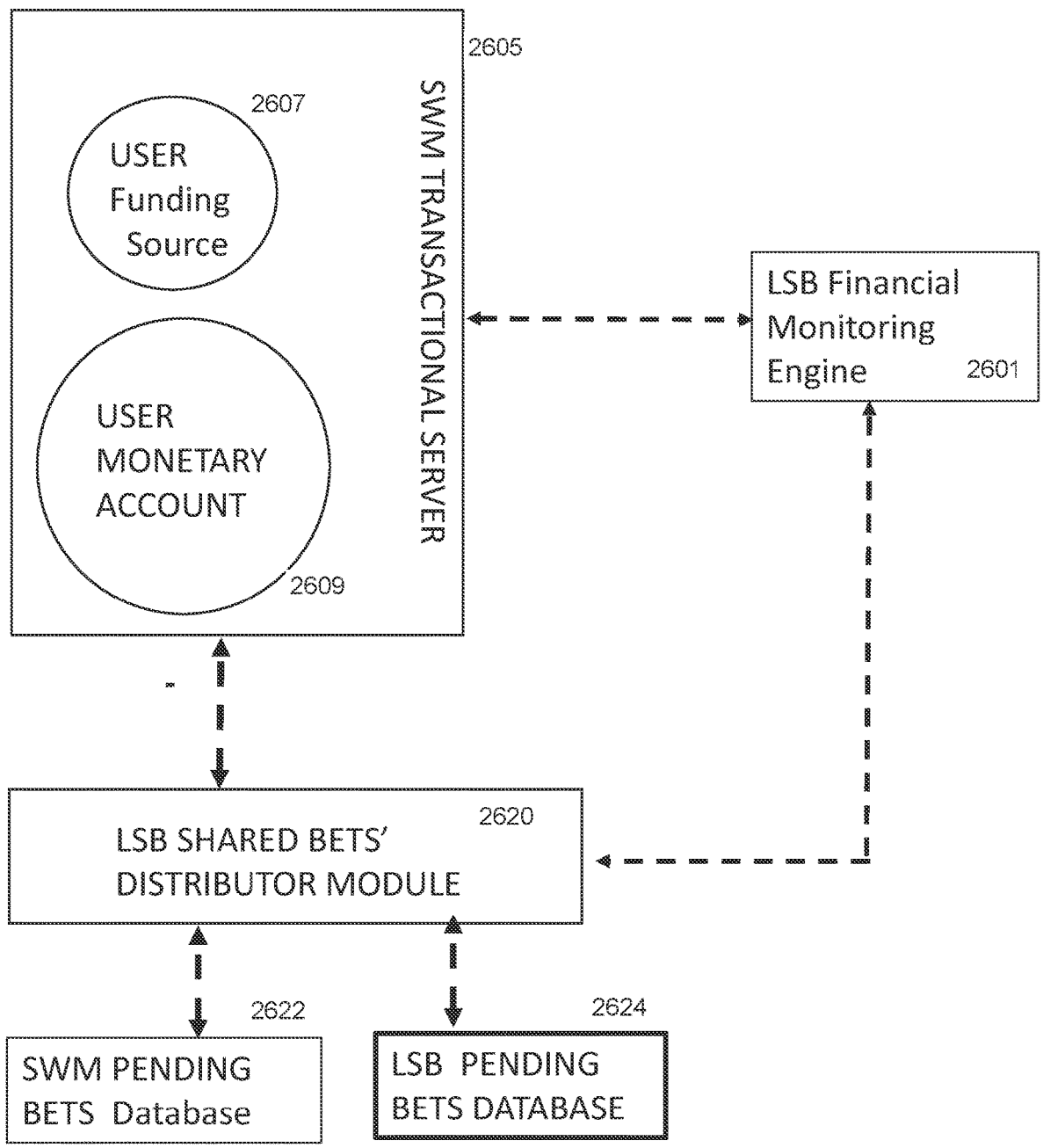
FIG. 26 is a schematic block diagram showing components of the monitoring function by the LSB financial monitoring of the user funding and monetary accounts maintained on the SWM transactional server in accordance with various embodiments of the invention.

A schematic block diagram showing exemplary components of the monitoring function by the LSB financial monitoring of the user funding and monetary accounts maintained on the SWM transactional server is illustrated in FIG. 26.

The LSB Financial monitoring engine 2601 may perform financial monitoring of the user funding sources 2607 and user monetary accounts 2609 maintained on the SWM transactional server 2605. The monitoring engine 2601 may also independently monitor the LSB shared bets distribution module 2620, which accesses and updates SWM pending bets database 2622 and LSB pending bets database 2624.

Figure 27:
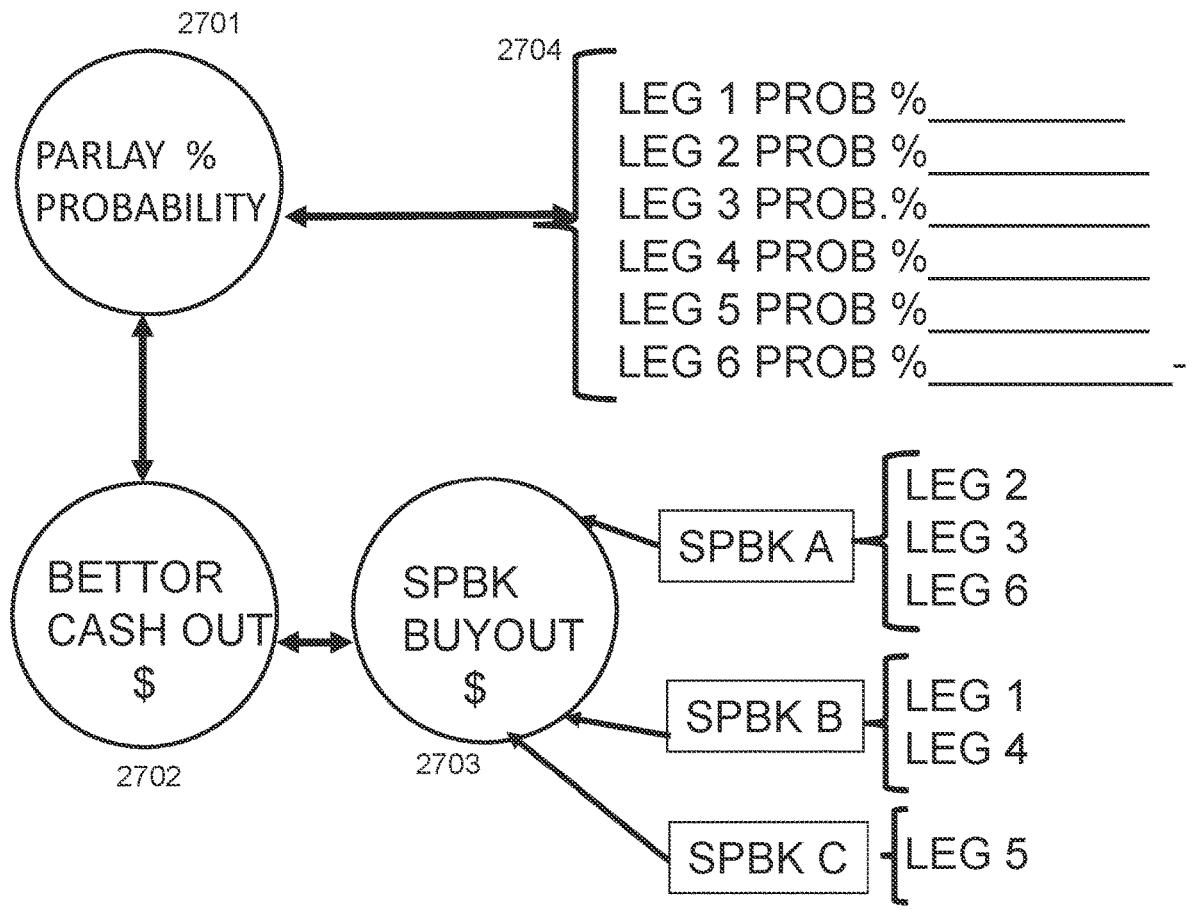
FIG. 27 is a schematic block diagram showing the parlay probability for multiple legs of an event, debtor cash out and sportsbook (SPBK) buyout processing.

FIG. 27 is a schematic block diagram showing the parlay probability 2601 for multiple legs of an event, 2603 with different percentage for different legs 1-6. FIG. 27 also illustrates a situation when bettor decides to cash out 2602, and the sportsbook decides to buyout 2603. In such case, the computerized system and method in certain embodiments will calculate the percentage of the buyout for the participating sportsbooks A, B and C, and apportion their respective financial obligation for the buyout for each leg 1-6 of the event. For example, sportsbook A in FIG. 27 may buyout legs 2, 3 and 6, while sportsbook B will buy out legs 1 and 4, and sportsbook C will buy out leg 5. Thus, this system permits a more granular approach and system in connection with a buyout, and accounting for different probabilities for each leg of the event.

Aspects of the present invention are described herein with reference to illustrations and/or drawings of methods, apparatus (systems), and computer program products according to embodiments of the invention. It will be understood that the flow or sequence of steps in the illustrations and/or drawings, and combinations thereof, is implemented by computer readable program instructions. These computer readable program instructions may be provided to a computer processor, such as a CPU, MPU or multiple processors, or other programmable data processing apparatus to produce a machine, such that the instructions, which execute via the processor of the computer or other programmable data processing apparatus, create means for implementing the functions/acts, data organization and data structures specified herein and also in the flow of the process and steps of the method that implements the present invention. These computer readable program instructions may also be stored in a computer readable storage medium (for example, RAM, ROM, CD, DVD or some other internal or external memory) that can direct a computer processor and computerized system, a programmable data processing apparatus, and/or other devices to function in a particular manner, such that the computer readable storage medium having instructions stored therein comprises an article of manufacture including instructions which implement the specific aforementioned features, structures and processes of the described embodiment(s) of the invention.

All structural and functional equivalents to the elements of the various embodiments described throughout this disclosure that are known or later come to be known to those of ordinary skill in the relevant art are expressly incorporated herein by reference and intended to be encompassed by the claims.

The described features, characteristics and elements of the invention may be incorporated in other structural forms or data structures, without departing from the spirit and scope of the invention. The invention encompasses embodiments both comprising and consisting of the elements described with reference to the illustrative embodiments.

The foregoing examples have been provided merely for the purpose of explanation and are in no way to be construed as limiting of the present invention disclosed herein. While the invention has been described with reference to various embodiments, it is understood that the words, which have been used herein, aye words of description and illustration, rather than words of imitation. Further, although the invention has been described herein with reference to particular means, materials, and embodiments, the invention is not intended to be limited to the particulars disclosed herein; rather, the invention extends to all functionally equivalent structures, methods, and uses, such as are within the scope of the appended claims. Those skilled in the art, having the benefit of the teachings of this specification, may affect numerous modifications thereto and changes may be made without departing from the scope and spirit of the invention in its aspects.

I claim:

1. A method of a plurality of licensed sportsbook operators (LSBs) utilizing a data network connection providing odds and processing wagering on sports and non-sports wagers placed by a plurality of user input devices, utilizing a single centralized interactive network website, utilizing computer readable program instructions stored in the computer memory that directs the processor to execute instructions to direct the network server to perform steps, comprising:
 obtaining electronically by the network server odds, spreads, and other data transmitted by a plurality of LSB betting platforms for display;
 wherein said odds, spreads, and other data are aggregated in the network server, thereby allowing the data to be stored and transmitted efficiently in the databases of the network server;
 receiving and processing a request from a user input device, utilizing an odds request page, requesting the network server to provide odds on specific periods of a future, pregame, or live sporting event or proposition from the LSBs participating in the shared network;
  wherein the location of the user input device is determined to be within the jurisdiction of the requested LSBs by the GLA server, thereby causing the processor to execute instructions to the user request search engine to search for the LSBs corresponding to the odds on the odds request page;
 electronically transmitting the requested odds to the input device by network server;
  wherein the input device electronically obtains the requested odds information;

transmitting by the user input device to the LSBs betting platforms, utilizing a computer interface, a betting ticket comprising a plurality of wagers from a plurality of LSBs selected from the odds request page by the user, including risk and win amounts for each bet;

wherein the processor executes instructions for, the user request search engine to determine data sources of the bets to facilitate the configuration of user input device with LSB betting engines;

wherein the processor executes instructions to the aggregator to aggregate the bet requests;

wherein the location of the input device is authenticated to be within the jurisdiction of the requested LSBs by the GPS authentication program and not restricted;

wherein user balances at LSBs corresponding to the bets are verified by the LSB financial monitoring engine to have sufficient funds in account to place said bets;

wherein the odds on the betting ticket have not changed;

receiving and processing by a plurality of LSB betting engines a single betting ticket comprising the wagers transmitted by user input device;

receiving by the input device, transmitted by the LSB betting platform the final betting ticket for confirmation by user;

confirming the final betting ticket by the user with the LSB betting engines, comprising a plurality of bets with a plurality of LSBs utilizing a single keystroke; and storing the received confirmed final betting tickets, received by the shared network server, containing the plurality of wagers placed by input device, into non-transient computer memory or external storage, organized as a user pending bets database of the user.

2. The method of claim 1, wherein the single betting ticket generated by the server and displayed on the input device combines bets for different LSBs, the method further comprising:

calculating risks and payout for each LSB on the single betting ticket that combines multiple bets utilizing a shared bets distributor module; and transmitting for display the risk and payout information for each bet of said LSBs utilizing a users pending bets database, thereby displaying total risk to win for the bets placed with the LSBs utilizing a single ticket on a single interactive website.

3. The method of claim 1, wherein at least one straight bet and at least one exotic wager from the LSBs are included within multiple combined bets on the same betting ticket, thereby including exotic wagers comprising bets of multiple LSBs utilizing a single interactive website.

4. The method of claim 3, further comprising:

computing and displaying LSB risk and win in the LSB database server of the LSBs contributing bets to the at least one exotic wager placed with the LSBs; 1 calculating the user total risk and payout of each exotic wager by the shared bets distributor module, thereby calculating the risk to win for the user pending database of the shared network.

5. The method of claim 1, wherein the LSB betting platform in communication with the user input device transmits information to said input device that the requested odds have changed before confirmation of the bet, comprising:

receiving and processing, by the network server from user's input device, additional requests for more favorable odds before finalizing the betting ticket, thereby allowing user to determine if more favorable odds are available from another LSB to replace the odds that have changed utilizing a single interactive website;

updating the odds on the betting ticket by the shared network server in the event that odds, spreads, or totals change, thereby allowing the user to receive the most favorable odds from the LSBs; and confirming the final betting ticket by the input device with the LSB betting platform providing the updated odds, thereby allowing the user to confirm the bet with changed odds from the LSBs utilizing a single interactive website.

6. The method of claim 5, wherein further comprising replacing a wager for a team or player with the odds of the opposing team or player, wherein odds have changed before confirming bets.

7. The method of claim 1, further comprising allowing wager processing through the shared network when the user is not a member with LSBs participating in the shared network, comprising:

a membership portal interface on the network server configured with the server of each of the LSBs, said LSB server generating a membership form to user input device; and user completing membership form and transmitting completed form to corresponding LSB, thereby allowing user to become a member of the LSBs during the betting process without leaving the interactive network website.

8. The method of claim 1, providing users with a method of funding an LSB account during the betting process, comprising:

providing electronic funding to the LSBs in which the user is a member, the funding including holding, debiting, crediting, or transferring funds to or from a monetary user account to each of the LSBs participating in the shared network;

wherein a funding interface on the network server is configured with the betting platform of the LSB generating a funding form; and wherein user completes funding form and transmits said form to the corresponding LSB, thereby providing user with a method to fund accounts of the LSBs during the betting process without leaving the interactive network website.

9. The method of claim 1, further comprising the network server processing a request from the user to display the most favorable odds and spreads for the designated side of the future, pregame, or live sporting event or proposition, wherein the user utilizes an odds request page to designate preference of spread or money line for said side of event or proposition.

10. A method of wagering utilizing a sports wager mall interactive website comprising a plurality of LSBs utilizing a data network connection, providing and processing sports and non-sports wagers placed by a plurality of user input devices, comprising:

a computer server serving a shared network of the LSBs transmitting odds and spreads of sporting events for display and betting to said computer server, the server having at least one computer processor, executing computer readable program instructions stored in computer memory, causing the computer server to:

receive and process a request from a user input device, utilizing an odds request page, requesting said server to provide odds or spreads on specific periods of a future, pre-game, or live sporting event or proposition from the LSBs participating in a shared server network;
wherein the location of the input device is determined to be within the
jurisdiction of the requested LSBs by the GLA server, thereby causing the processor to execute computer instructions to the user request search engine to search for the corresponding LSBs of the odds on the odds request page,
electronically transmit the requested odds or spreads to the odds request page;
electronically obtain by the user input device from the network server the said requested odds or spreads information;
transmit by the user input device to a plurality of LSBs betting platforms, utilizing a computer interface, a single betting ticket comprising a plurality of wagers from a plurality of LSBs selected from the odds request page by the user, including risk and win amounts for each bet;
wherein data on said betting ticket is aggregated by the network aggregator;
wherein the location of the user's input device is authenticated to be within the jurisdiction of the LSBs of the bets by the GPS authentication program, thereby causing the processor to execute computer instructions for the input device configured with a computer interface to transmit bets to the LSB platforms within a shared server utilizing one website;
wherein the processor executes instructions for the user request search
engine to determine the source of said wagers to facilitate the input device configuring with a corresponding LSB betting engine;
wherein the LSB platforms receive and process a plurality of wagers
transmitted by the user input device on a betting ticket comprising wagers selected from the odds request page by the user, including risk and win amounts;
wherein said plurality of wagers combine multiple bets into a single betting
ticket utilizing a shared bets distributor module;
receive the final betting ticket by the user's input device from the LSB betting platforms;
confirm the final betting ticket by user with the LSB betting engines, comprising a plurality of bets with the LSBs, utilizing a single keystroke; and
store the confirmed betting tickets, containing the wagers, into non transient computer memory or external storage, organized as a pending bets database of the user through a shared bets distributor module, thereby providing user storage for pending bets of the LSBs utilizing one interactive website on the shared server.

11. The method of claim 1, wherein the processor performs computer instructions that cause the server to maintain the databases of histories and pending bets made by a plurality of users with the LSBs;
comprising:
updating the user pending bets database with the cashout options transmitted by LSB betting platform servers;
extracting the pending bets of user from the database of pending bets after the events are graded;
updating the user's betting history in the shared network server with the pending bets that have been graded, thereby updating the betting history of bets made at the LSBs utilizing one single interactive website; and
updating LSB balances of user with payouts of winning graded pending wagers.

12. The method of claim 1, wherein the processor performs computer instructions that cause the shared network server to:
provide a user interface for viewing and displaying the betting history on input device of user, the pending wagers of bets placed at the LSBs by the user, and displaying balances of LSB accounts in which the user maintains a membership,
comprising:
a user monetary account database, a user betting history database, and a user pending bets database, thereby providing access to account activity of the LSBs utilizing a shared server on a single interactive website.

13. The method of claim 10, wherein the processor performs computer instructions that cause the shared network server to allow wager processing through the shared network when the user is not a member with the LSBs participating in the shared network, wherein the bets are not placed with the LSBs betting platforms but stored in the user database, thereby allowing the user to use the shared server network website for guest or other non-betting purposes.

14. The method of claim 10, wherein the funding of the LSBs is processed and proceeds through at least one transactional server of the shared network, transmission comprising:
transmitting funding requests by the user interface module to the funding interface;
wherein the transferring of funds is between and among the LSBs where the user is a member and between a monetary account and one or more funding accounts of the LSBs utilizing a LSB financial monitoring engine.

15. The method of claim 1, wherein the processor executes
computer instructions that cause the GLA server to:
enhance search results for logins to multiple jurisdictions to determine whether there are any restrictions on providing odds to the user or permitting placement of a bet by the user with any of the LSBs;
comprising:
analyzing logins in the sportsbook login database of the GLA server to multiple jurisdictions by users of the shared wagering network, wherein the server identifies by behavioral comparison through bets and geographical placement of bets within proximity of league facilities users violating state and federal laws, LSB, industry, or league rules, or regulations; and
comparing biometric data.

16. The method of claim 1, wherein the LSBs' display and betting of one or more non-sporting or sporting event odds or spreads are transmitted to an interactive video machine, kiosk, or television display.

17. The method of claim 1 or 10, wherein virtual machines are utilized in the shared network.

18. The method of claim 3, wherein LSBs contributing bets to an exotic wager buyout other LSBs for total risk and win of the wager.

* * * * *